US007620324B2

(12) United States Patent
Minato et al.

(10) Patent No.: US 7,620,324 B2
(45) Date of Patent: Nov. 17, 2009

(54) OPTICAL DIVISION MULTIPLEXING TRANSMISSION AND RECEPTION METHOD AND OPTICAL DIVISION MULTIPLEXING TRANSMISSION AND RECEPTION DEVICE

(75) Inventors: Naoki Minato, Tokyo (JP); Takeshi Kamijoh, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 599 days.

(21) Appl. No.: 11/361,357

(22) Filed: Feb. 24, 2006

(65) Prior Publication Data

US 2006/0193633 A1    Aug. 31, 2006

(30) Foreign Application Priority Data

Feb. 25, 2005 (JP) ............................. 2005-050558

(51) Int. Cl.
*H04B 10/00* (2006.01)
(52) U.S. Cl. .............................. 398/77; 398/78; 398/89; 398/98
(58) Field of Classification Search ............. 398/74–79, 398/89, 98–103
See application file for complete search history.

(56) References Cited

U.S. PATENT DOCUMENTS 4,703,474 A * 10/1987 Foschini et al. ............. 370/441

(Continued)

FOREIGN PATENT DOCUMENTS

JP    2000-209186    7/2000

(Continued)

OTHER PUBLICATIONS

"Error-Free transmission of 2-channelx2.5 Gbit/s time-spread/wavelength-hop OCDM using fibre Bragg grating with supercontinuum light source", N. Wada, et al., ECOC'99, Sep. 1999.

(Continued)

*Primary Examiner*—Agustin Bello
(74) *Attorney, Agent, or Firm*—Venable LLP; James R. Burdett

(57) ABSTRACT

An object of the present invention is to implement optical multiplexing transmission and reception in which an OCDM channel is added without changing the used wavelength bandwidth of the existing WDM channel or without changing the time slot allocated to the existing OTDM channel. Hence, one of the embodiments of the present invention is constituted as follows. The OCDM signal generation section generates an encoded optical pulse signal by encoding an optical pulse signal. The encoded optical pulse signal is inputted to the wavelength disperser and the time waveform of the encoded optical pulse signal is shaped to be outputted as a shaped and encoded optical pulse signal. The WDM signal generation section generates an optical wavelength division multiplexing signal. The OCDM signal extraction section decodes the OCDM reception signal by using the same code as the time-spreading/wavelength-hopping code for each channel and generates a decoded OCDM reception signal. The shaped and encoded optical pulse signal component that is contained in the decoded OCDM reception signal is restored by the inverse-wavelength disperser and a reproduced optical pulse signal is generated. Only the autocorrelation waveform component of the optical pulse signal constituting the OCDM transmission signal is extracted from the reproduced optical pulse signal by the first threshold value judgment section. In the WDM signal extraction section, the second threshold value judgment section extracts the WDM signal of each channel from the WDM reception signal.

8 Claims, 18 Drawing Sheets

U.S. PATENT DOCUMENTS

| | | | |
|---|---|---|---|
| 4,989,199 A * | 1/1991 | Rzeszewski | 398/46 |
| 6,025,944 A * | 2/2000 | Mendez et al. | 398/78 |
| 6,381,053 B1 * | 4/2002 | Fathallah et al. | 398/99 |
| 6,944,400 B2 * | 9/2005 | Kashima | 398/56 |
| 7,065,298 B1 * | 6/2006 | Munroe et al. | 398/77 |
| 7,177,500 B2 * | 2/2007 | Shahar | 385/37 |
| 7,224,902 B2 * | 5/2007 | Nishiki | 398/87 |
| 7,272,318 B2 * | 9/2007 | Lee et al. | 398/78 |
| 7,308,199 B2 * | 12/2007 | Kim et al. | 398/78 |
| 7,324,753 B2 * | 1/2008 | Kashima et al. | 398/77 |
| 7,324,754 B2 * | 1/2008 | Kobayashi et al. | 398/77 |
| 7,324,755 B2 * | 1/2008 | Izadpanah | 398/78 |
| 7,330,656 B2 * | 2/2008 | Lee et al. | 398/78 |
| 7,525,944 B2 * | 4/2009 | Vayanos et al. | 370/342 |
| 7,536,105 B2 * | 5/2009 | Teramoto | 398/78 |
| 2005/0084266 A1 * | 4/2005 | Pohjola et al. | 398/77 |
| 2005/0129382 A1 | 6/2005 | Sakakibara et al. | |
| 2006/0115272 A1 * | 6/2006 | Minato et al. | 398/77 |
| 2006/0193633 A1 * | 8/2006 | Minato et al. | 398/77 |
| 2007/0196108 A1 * | 8/2007 | Tamai et al. | 398/77 |
| 2007/0223927 A1 * | 9/2007 | Sasaki et al. | 398/98 |
| 2007/0286603 A1 * | 12/2007 | Minato | 398/53 |
| 2008/0107429 A1 * | 5/2008 | Galli et al. | 398/188 |
| 2009/0010646 A1 * | 1/2009 | Sasaki | 398/43 |

FOREIGN PATENT DOCUMENTS

| | | |
|---|---|---|
| JP | 2003-248251 | 9/2003 |

OTHER PUBLICATIONS

"Demonstration of a Four-Channel WDM-OCDMA System Using 255-Chip 320-Gchip/s Quarternary Phase Coding Gratings" P. C. Teh, et al., IEEE, Photonics Technology Letters., vol. 1414, No. 2, Feb. 2002, pp. 227-229.

"An incoherent wavelength hopping/time spreading code-division multiple access system", S. Yegnanarayanan, el al., ECOC'99, Sep. 1999.

"Optical Code Division Multiplexing (OCDM) and Its Applications to Photonic Networks", K. Kitayama et al., IEICE Trans. Fundamentals, vol. E82-A, No. 12, Dec. 1999, pp. 2616-2626.

"Nonlinear Fiber Optics", Govind P. Agrawal et al., Second Edition, Academic Press, published in 1989.

"Reduction of Interchannel Interference Noise in a Two-Channel Grating Based OCDMA System Using a Nonlinear Optical Loop Mirror", Ju Han Lee et al., IEEE, Photonics Technology Letters, vol. 13, No. 5, May 2001, pp. 529-531.

* cited by examiner

WDM

OTDM

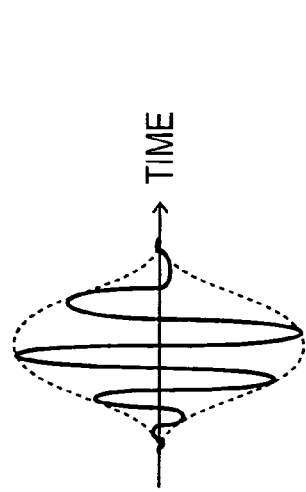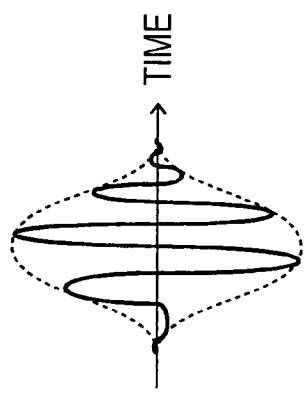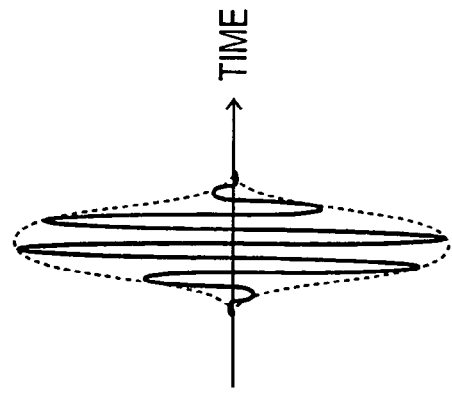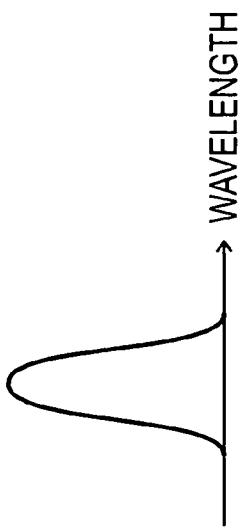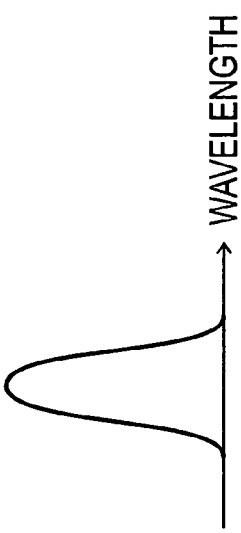
FIG.6A  FIG.6B  FIG.6C

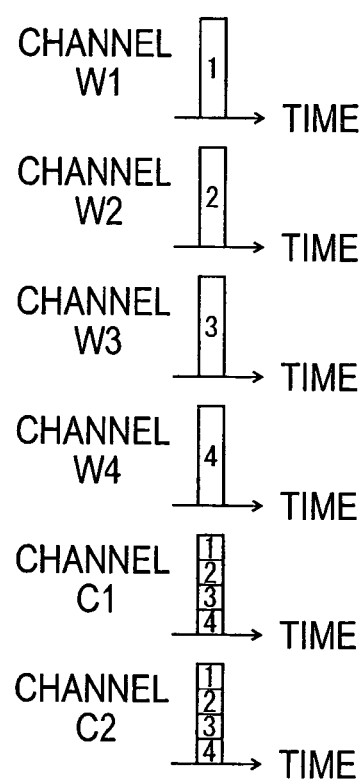

OPTICAL DIVISION MULTIPLEXING TRANSMISSION AND RECEPTION METHOD AND OPTICAL DIVISION MULTIPLEXING TRANSMISSION AND RECEPTION DEVICE

BACKGROUND OF THE INVENTION

1. Field of the Invention

The present invention relates to an optical division multiplexing transmission and reception method and an optical division multiplexing transmission and reception device and, more particularly, to a method and device that make it possible for wavelength division multiplexing (WDM) transmission and reception and optical code division multiplexing (OCDM) transmission and reception to coexist. Further, the present invention relates to a method and device that make it possible for optical time division multiplexing (OTDM) transmission and reception and OCDM transmission and reception to coexist.

2. Description of Related Art

In order to increase the speed or capacity of optical fiber communications, an optical division multiplexing technology that transmits a plurality of channels' worth of optical pulse signals all together on one optical fiber transmission line has been investigated. As means for the optical division multiplexing, WDM, which separates channels by means of the wavelengths of the optical pulses constituting the optical pulse signals, OTDM, which separates channels by means of the time slots that are occupied by the optical pulses that constitute the optical pulse signals, and OCDM, which separates channels by means of pattern matching of encoded optical pulse signals have each been researched.

Therefore, WDM and OTDM will be described first with reference to FIG. 1. FIG. 1 is a schematic block constitutional view of an optical division multiplexing transmission and reception device in which a transmission section 100 and reception section 200 are constituted linked by an optical fiber 105, which is a transmission line. The number of channels is denoted as n.

The transmission section 100 comprises a transmitter 101, transmitter 102, and transmitter 103 for the first to nth channels respectively. Further, a multiplexing device 104 that mixes and multiplexes the optical pulse signals of the first to nth channels outputted from the transmitters is provided. The transmitter 101, transmitter 102, and transmitter 103 convert electrical signal 110, electrical signal 111, and electrical signal 112 of the first to nth channels into the optical pulse signal 120, optical pulse signal 121, and optical pulse signal 122 respectively. The optical pulse signals outputted from the respective transmitters of the first to nth channels are mixed and multiplexed by the multiplexing device 104 and outputted as an optical division multiplexing signal 126.

The optical division multiplexing signal 126 outputted from the multiplexing device 104 is transmitted to the reception section 200 through propagation via the optical fiber 105 constituting the transmission line.

The reception section 200 comprises a receiver 107, receiver 108, and receiver 109 for the first to nth channels respectively. Further, a separator 106 that separates the optical division multiplexing signal 126 that is inputted to the receivers is provided.

Here, the optical division multiplexing transmission and reception device shown in FIG. 1 will first be described as a WDM transmission and reception device. In the case of the WDM transmission and reception device, light of a different wavelength for each channel is allocated as the carrier wave for the respective channel information. That is, in the case of a WDM transmission and reception method and a device that implements this method, the wavelength of the carrier-wave light plays the role of an identifier for identifying the channel.

An optical coupler, for example, is used as the multiplexing device 104. Further, an optical element rendered by combining an optical coupler and optical wavelength filter, for example, or an optical element that has a wavelength separation function such as an Array Waveguide Grating (AWG) is used as the separator 106. Therefore, the inputted multiple-wavelength optical division multiplexing signal 126 is separated by the separator 106 into wavelengths that are allocated to each channel which are then outputted. As a result, optical pulse signals of wavelengths that are allocated to the respective channels are supplied to the receiver 107, receiver 108, and receiver 109.

OTDM will be described next. The optical division multiplexing transmission and reception device shown in FIG. 1 is described as an OTDM transmission and reception device. Optical pulse signals that are modulated to the RZ (Return to Zero) format are outputted from the transmitter 101, transmitter 102, and transmitter 103. When the optical pulse signals of the first to nth channels are mixed by the multiplexing device 104, adjustment of the timing for inputting the optical pulses to the time slots provided for all the channels is performed by using a variable delay line or the like, for example.

A combination of an optical coupler that intensity-divides the optical division multiplexing signal 126 outputted from the multiplexing device 104 according to the number of channels, and an optical modulator that allows light of only a specified time slot to be transmitted, for example, is used for the separator 106. The separator 106 separates the optical division multiplexing signal 126 into each channel and the optical pulse signal 123 of the first channel, the optical pulse signal 124 of the second channel, and the optical pulse signal 125 of the nth channel are supplied to the receiver 107, receiver 108, and receiver 109 of the respective channels. The receiver 107, receiver 108, and receiver 109 convert the O/E converted optical pulse signals into electrical pulse signals and receive the electrical pulse signals 113, 114, and 115 of the respective channels.

The dispositional relationship of the optical pulses that constitute the respective optical pulse signals on the wavelength axis and time axis of WDM and OTDM respectively will now be described with reference to FIGS. 2A and 2B. FIG. 2A shows an aspect in which the respective channels are arranged divided on the wavelength axis for WDM. Further, FIG. 2B shows an aspect in which the respective channels are allocated to each positional slot divided into time slots on the time axis for OTDM.

When FIGS. 2A and 2B are referenced, it can be seen that the wavelength bandwidth is used in the WDM case and time slots designated through division on the time axis are used in the OTDM case in order to allocate the respective channels. That is, WDM and OTDM are systems in which one of the physical resources such as wavelengths or time slots in which one channel is divided on the wavelength axis or time axis is used occupied.

It can be seen from the above description that, for OTDM, the wavelength of the light source is basically not a problem. However, in order to increase the number of multiplexed channels in OTDM, the time slots allocated to the respective channels must be shortened and the half-value width on the time axis of the optical pulses constituting the optical pulse signals must also be narrowed.

On the other hand, in the case of WDM, separation from multiplexed optical pulse signals into optical pulse signals for each channel can be implemented by a passive light component with a wavelength separation function. Further, an optical pulse signal in the RZ format or an NRZ (Non-Return to Zero) format signal can be applied as an optical pulse signal and the number of multiplexed channels can be changed even without changing the transmission speed (bit rate). In addition, merits such as the fact that asynchronous multiplexing can also be implemented are combined. As a result, WDM-related research has been vigorously performed until now and is currently put to practical use.

Recently, research into OCDM, which is a method different from WDM and OTDM mentioned above, has begun as an optical multiplexing method. The merit of OCDM is that there is no need to occupy one of the physical resources such as wavelengths or time slots in which one channel is divided on the wavelength axis or time axis as per WDM and OTDM.

The constitution and functions of an example of an OCDM device will be described to with reference to FIGS. 3A to 3E (See N. Wada, et al., "Error-free transmission of 2-channel× 2.5 Gbit/s time-spread/wavelength-hop OCDM using fibre Bragg grating with supercontinuum light source", ECOC'99, September 1999) and Japanese Patent Application Laid Open No. 2000-209186, for example). The OCDM device shown in FIG. 3A is a constitution in which a transmission section 300 and a reception section 400 are linked by a transmission line 310. The transmission line 310 is an optical fiber. In order to avoid a complicated description, FIG. 3A shows a device that assumes transmission and reception on two channels. It is clear from the following description that an OCDM device that permits transmission and reception on three or more channels can be similarly implemented by increasing the number of channels.

The transmission section 300 comprises a first-channel encoder 303, a second-channel encoder 304, and a multiplexer 307. The first channel encoder 303 encodes a first-channel optical pulse signal 301 by means of code supplied by Code 1 and outputs the result as the first-channel encoded optical pulse signal 305. The second-channel encoder 304 similarly encodes a second-channel optical pulse signal 302 by means of code supplied by Code 2 and outputs the result as the second-channel encoded optical pulse signal 306.

FIG. 3B shows the time waveforms of the first- and second-channel optical pulse signals. The optical pulses constituting the first- and second-channel optical pulse signals contain light components of different wavelengths $\lambda_1$, $\lambda_2$, and $\lambda_3$. In order to illustrate this, rectangles that surround the numbers 1, 2, and 3 that identify the wavelengths $\lambda_1$, $\lambda_2$, and $\lambda_3$ are expediently shown stacked on the same time. Here, optical pulse signals that are constituted by optical pulses containing wavelengths of three different types are assumed and illustrated. However, the types of wavelengths that are generally contained in optical pulses are not limited to three types and the following description is similarly established in cases where two or more than two types are established.

The fact that the optical pulses contain light components of the different wavelengths $\lambda_1$, $\lambda_2$, and $\lambda_3$ and so forth means that, when the optical pulses are arranged broken down on the wavelength axis, that is divided, division is into optical pulses whose center wavelengths are $\lambda_1$, $\lambda_2$, and $\lambda_3$ and so forth. Further, optical pulses that comprise a single optical wavelength component that is obtained by wavelength breakdown of optical pulses constituted comprising a plurality of light components will also be referred to subsequently as a chip pulse.

Hereinafter, it is assumed that optical pulses containing different wavelength components are shown by stacking rectangles surrounding identification numbers denoting the wavelengths of the wavelength components on the same time.

Further, in order to identify the first-channel optical pulses and second-channel optical pulses, the second-channel optical pulses is shown shaded.

FIG. 3C shows a first-channel encoded optical pulse signal 305 and second-channel encoded optical pulse signal 306 with respect to the time axis. As shown in FIG. 3C, when the first-channel encoded optical pulse signal 305, for example, is considered, the optical pulses constituting the first-channel optical pulse signal 301 are divided by the encoder 303 into optical pulses (chip pulses) with the center wavelengths $\lambda_1$, $\lambda_2$, and $\lambda_3$ and arranged after undergoing time spreading on the time axis. The same is true of the second-channel encoded optical pulse signal 306. However, because the code (Code 1) established for the first-channel encoder and the code (Code 2) established for the second-channel encoder are different codes, the positions for arranging the respective chip pulses arranged on the time axis of the first- and second-channel encoded optical pulse signals are different.

Thus, the encoding performed by the device shown in FIG. 3A is a method that performs encoding by subjecting the optical pulses to time spreading on the time axis and then division into optical pulses (chip pulses) with the center wavelengths $\lambda_1$, $\lambda_2$, and $\lambda_3$ that constitute the optical pulses and is therefore known as encoding by means of time-spreading/wavelength-hopping code. That is, encoding of the first- and second-channel input optical pulse signals 301 and 302 by means of time-spreading/wavelength-hopping code by means of the first-channel encoder 303 and second-channel encoder 304 is performed.

FIG. 3D shows an optical code division multiplexing signal 308 rendered by multiplexing the first-channel encoded optical pulse signal 305 and second-channel encoded optical pulse signal 306 by means of the multiplexer 307. The multiplexer 307 affords a multiplexer function of multiplexing optical signals of a plurality of channels. A chip pulse array that constitutes the first-channel encoded optical pulse signal 305 and a chip pulse array that constitutes the second-channel encoded optical pulse signal 306 are stacked on the same time axis as shown in FIG. 3C. Here, in order to be able to identify the chip pulses constituting the first-channel encoded optical pulse signal and the chip pulses constituting the second-channel encoded optical pulse signal, the latter second-channel encoded optical pulse signal is shaded.

The optical code division multiplexing signal 308 is sent to the reception section 400 through propagation via the transmission line 310. The reception section 400 comprises a splitter 410, and a first-channel decoder 413 and second-channel decoder 414. The splitter 410 subjects the optical code division multiplexing signal 308 to intensity division, supplying one of the split signals to the first-channel decoder 413 as a split optical code division multiplexing signal 411 and the other to the second-channel decoder 414 as a split optical code division multiplexing signal 412.

The first-channel decoder 413 plays back the split optical code division multiplexing signal 411 by decoding same by means of code that is supplied by Code 1 and outputs the decoded signal as a first-channel optical pulse signal 415. The second-channel decoder 414 similarly plays back the split optical code division multiplexing signal 412 by decoding same by means of code that is supplied by Code 2 and outputs the decoded signal as a second-channel optical pulse signal 416. The optical pulse signals that are played back by the respective decoders are also subsequently called the decoded optical pulse signals.

FIG. 3E shows that the optical code division multiplexing signal 308 undergoes intensity division for each of the first and second channels by means of the splitter 410 with which the reception section 400 is provided and shows the decoded optical pulse signals that are decoded by the first-channel decoder 413 and second-channel decoder 414 for the first and second channels.

First, the first-channel decoded optical pulse signal 415 will be described. In an aspect that represents the optical intensity with respect to the time axis of the first channel in FIG. 3E, chip pulses that originate in the second-channel optical pulse signal are shown by shaded rectangles that surround the numbers identifying the wavelength and chip pulses that originate in the first-channel optical pulse signal do not have shaded rectangles that surround the numbers identifying the wavelengths.

The chip pulses originating in the first-channel optical pulse signal are chip pulses that are generated encoded by code supplied by Code 1 and, therefore, if the chip pulses are decoded by means of code supplied by the same Code 1, the respective chip pulses are arranged to occupy the same positions on the time axis with the time delays provided during encoding exactly offset. That is, the original optical pulse signal is played back as an autocorrelation waveform.

Looking at the diagram representing the optical intensity with respect to the time axis of the first channel in FIG. 3E, unshaded rectangles that surround the numbers 1, 2, and 3 are stacked on the same time. On the other hand, shaded rectangles that surround the numbers 1, 2, and 3 appear as a mutual interlayer waveforms that are arranged dispersed in different positions on the time axis. Shaded rectangles that surround the numbers 1, 2, and 3 are chip pulses that originate in the second channel and are chip pulses that constitute encoded optical pulse signals that are encoded by means of Code 2. That is, because the encoded optical pulse signal component comprising chip pulses originating in the second channel is executed by means of codes which are different for encoding and decoding, the time lag provided during encoding is not offset during decoding and is constituted as a mutual interlayer waveform that is time-dispersed once again.

In a drawing that represents the optical intensity with respect to the time axis of the second channel in FIG. 3E, a relationship results that is the inverse of that described above. That is, chip pulses originating in the second channel form autocorrelation waveforms and chip pulses originating in the first channel form mutual correlation waveforms. This is because the constitution is such that the second channel is encoded by code that is provided by means of Code 2 and decoded by code that is provided by Code 2.

Because the intensity-divided optical code division multiplexing signal 412 is decoded by means of code that is provided by Code 2, the time lag provided during encoding of the chip pulses originating in the first channel that are encoded by means of code provided by Code 1 contained in the optical code division multiplexing signal 412 is not offset during decoding and the chip pulses are constituted once again as time-spread mutual correlation waveforms. On the other hand, the time lag provided during encoding of the chip pulses originating in the second channel that are encoded by code that is provided by Code 2 contained in the optical code division multiplexing signal 412 is offset during decoding and constituted as an autocorrelation waveform.

As described hereinabove, the decoded optical pulse signal 415 of the first channel and the decoded optical pulse signal 416 of the second channel are established as the sum of autocorrelation waveforms and mutual correlation waveforms respectively. As shown in FIG. 3E, because the peak intensity is different in the autocorrelation waveform and the mutual correlation waveform (the peak of the autocorrelation waveform is larger), if the mutual correlation waveform component is removed by subjecting the peak values of the waveforms to a threshold value judgment in which the size of the peak values are judged with respect to a preset threshold value, only the autocorrelation waveform component is removed. If the respective autocorrelation waveform components of each channel can be extracted, the autocorrelation waveforms are the respective optical pulse signals that are played back and, therefore, if the optical pulse signals are converted to electrical signals, the transmitted information can be received.

Encoding and decoding methods include a method for encoding an optical pulse signal that uses light of a single wavelength in addition to the time-spreading/wavelength-hopping method. With this method, encoding is performed by arranging the optical pulses that constitute the optical pulse signal on a time axis by means of breakdown into chip pulses with a phase difference provided between the respective chip pulses (See P. C. Teh, et al. "Demonstration of a Four-Channel WDM/OCDMA System Using 255-Chip 320-Gchip/s Quarternary Phase Coding Gratings" IEEE, Photonics Technology Letters., vol. 14, No. 2, pp. 227-229, February 2002), for example). This encoding is also known as time-spreading encoding.

A Super Structure Fiber Bragg Grating (SSFBG) is known as an example of means for implementing the encoding and decoding. The structure and operation of an FBG optical encoder will now be described with reference to FIGS. 4A and 4B. In FIG. 4A, an aspect in which the refractive index distribution structure and the refractive index variation of the core of the optical fiber in which an SSFBG is formed is shown divided into an upper view and a lower view. As shown in the upper view of FIG. 4A, the inputted optical pulse is inputted to the SSFBG from the left side of FIG. 4A and the chip pulse array thus generated is also outputted from the left side. In the case of the SSFBG shown in FIG. 4A, because units FBG G1, FBG G2, and FBG G3 are arranged in series, code of code length 3 is established for the SSFBG. Hereinafter, an SSFBG that is constituted with a plurality of units FBG arranged in series will also be known simply as an FBG.

The refractive index modulation cycles (also called the 'grating pitch') of the units FBG G1, FBG G2, and FBG G3 are $\Lambda_1$, $\Lambda_2$, and $\Lambda_3$ respectively as shown by the lower view of FIG. 4A. Generally, there is the relation $\lambda=2n\Lambda$ between the refractive index modulation cycle $\Lambda$ and the Bragg reflection wavelength $\lambda$. Here, n is the average refractive index of FBG. That is, the Bragg reflection wavelength $\lambda$ of unit FBG is determined by establishing the grating pitch $\Lambda$ of unit FBG.

Here, when a plurality of units FBG with different grating pitches are arranged in series in one optical fiber, light (also known as 'Bragg reflection light' hereinbelow) of wavelengths corresponding with the grating pitch is obtained from each unit FBG. The Bragg reflection light that is reflected from the respective units FBG is reflected with different time lags in accordance with the points at which the units FBG are disposed. The use of this fact is encoding using FBG time spreading waveform hopping.

A constitutional example of an FBG optical encoder will now be described with reference to FIG. 4B. The optical encoder shown in FIG. 4B is constituted comprising an FBG 352 and an optical circulator 350. The encoded optical pulses are inputted from the input port 348 on the left-hand side of FIG. 4B to the FBG 352 via the optical circulator 350 as input light. Because the FBG 352 comprises units FBG G1, FBG G2, and FBG G3, Bragg reflection light of different wavelengths reflected from the respective units FBG is reflected. The Bragg reflection light is outputted as encoded optical pulses from an input port 354 on the right-hand side of FIG. 4B via the optical circulator 350.

Means constituted by combining an AWG (Array Waveguide Grating) and optical delay line are also known in addition to the abovementioned FBG as an optical encoder that is capable of implementing time-spreading wavelength hopping encoding (See S. Yegnanarayanan, et al., "An incoherent wavelength hopping/time spreading code-division multiple access system", ECOC'99, September 1999), for example).

Procedures for removing the autocorrelation waveform component by separating the autocorrelation waveform component and the mutual correlation waveform component from the optical pulse signal decoded on the reception side include a time gate method in addition to the abovementioned method that uses a threshold value judgment. A time gate method is a method that uses time gate means that transmit signals only in a time zone in which the autocorrelation waveform passes by performing time adjustment so that the mutual correlation waveform overlaps the autocorrelation waveform.

As time gate means, a time gate method that uses an electro-absorption modulator (EA modulator) is known (See Naoki Minato et al., IEICE OCS2003-24, pages 49 to 54, May 2003, for example). That is, the transmission rate of the EA modulator increases by the time zone through which the autocorrelation waveform passes and, as a result of slight control in the time zone through which the mutual correlation waveform component passes, a time gate is implemented. The control of the transmission rate of the EA modulator employs a clock signal.

Further, as time gate means, a time gate method that uses an SOA (Semiconductor Optical Amplifier) is known (See K. Kitayama et al., "Optical Code Division Multiplexing (OCDM) and Its Applications to Photonics Networks", IEICE Trans. Fundamentals, vol. E82-A, No. 12 pp. 2616-2626, December 1999), for example) This method first extracts an optical clock from a portion of the signals that are decoded by using a mode synchronization semiconductor laser. Thereafter, the decoded signals and optical clock are inputted to the SOA and the SOA produces the four-wave mixing effect in sync with the optical clock. Further, the time gate means are implemented such that only optical pulses overlapping the time zone in which the SOA is in the ON state can be transmitted by the SOA as a result of the four-wave mixing effect that is produced in sync with the optical clock.

As mentioned hereinabove, the OCDM has the characteristic that there is not necessarily a need for one channel to occupy one of the physical resources (wavelength bandwidth and time slot or the like). On the other hand, with WDM, there is a need to allocate a different wavelength bandwidth to each channel. Further, with OTDM, it is necessary to allocate a different time slot to each channel on the time axis.

Furthermore, with OCDM, the code that was used during encoding must be known in order to decode the encoded optical pulse signal that was sent encoded on the reception side. Hence, unless the code used to encode the transmitted optical pulse signal is published, a third party who is unaware of the code is unable to decode the encoded optical pulse signal. This is because optical communications using OCDM are highly stable in comparison with optical communications using WDM or OTDM or the like.

In addition, merits of OCDM include the fact that an increase in the number of channels can be dealt with flexibly. For example, with WDM, in order to increase the number of channels within the restricted communication wavelength bandwidth, the wavelength bandwidth allocated to all the channels must be reset by narrowing the wavelength bandwidth allocated to each channel. Further, similarly with OTDM, in order to increase the number of channels within the restricted communication wavelength bandwidth, the time slots allocated to all the channels must be reset by narrowing the width of the time slots allocated to each channel. Before optical communications are to be performed by means of WDM or OTDM, the light source, wavelength separator, and so forth constituting the optical communication device that is used must be changed.

On the other hand, in the case of OCDM, if the size of the ratio between the peak value of the mutual correlation waveform and the peak value of the autocorrelation waveform can be secured to the extent of being able to extract an autocorrelation waveform by removing the mutual correlation waveform from the decoded optical pulse signal, channels can be added simply by adding code types. That is, the addition of new channels can be implemented simply by adding an encoding section and decoding section for which new codes corresponding with the newly added channels have been set without changing the constituent parts of channels other than the added channels of the optical communication device.

If a method and device that allow WDM transmission and reception and OCDM transmission and reception to be implemented at the same time without changing the hardware resources of the WDM optical multiplexing communication system can be implemented, the number of channels that can be received can be increased. Alternatively, if a method and device that allow OTDM transmission and reception and OCDM transmission and reception to be implemented at the same time can be implemented, the number of channels that can be transmitted and received can be increased. In addition, OCDM transmission and reception afford the abovementioned benefits.

SUMMARY OF THE INVENTION

Therefore, an object of the present invention is to provide an optical multiplexing transmission and reception device and optical multiplexing transmission and reception method in which an OCDM channel is added without changing the wavelength bandwidth used by the existing WDM channel. Further, an object is to provide an optical multiplexing transmission and reception device and optical multiplexing transmission and reception method in which an OCDM channel is added without changing the time slot allocated to the existing OTDM channel.

Here, the WDM channel, OTDM channel, and OCDM channel indicate channels that are transmitted and received by means of WDM, OTDM, and OCDM respectively. The WDM channel, OTDM channel, and OCDM channel are used with this meaning hereinafter.

The optical division multiplexing transmission and reception method of a first invention comprises a transmission step that comprises, in parallel, an optical code division multiplexing signal generation step and an optical wavelength division multiplexing signal generation step, and a reception step that comprises, in parallel, an optical code division multiplexing signal extraction step and an optical wavelength division multiplexing signal extraction step.

The optical code division multiplexing signal generation step comprises an encoding step and a time waveform shaping step. The encoding step is a step that generates an encoded optical pulse signal by encoding an optical pulse signal by using time-spreading wavelength-hopping code that is different for each channel. The time waveform shaping step is a step that generates a shaped and encoded optical pulse signal by shaping the time waveform of the encoded optical pulse signal.

The optical wavelength division multiplexing signal generation step is a step that generates an optical wavelength division multiplexing signal by allocating a wavelength that is different for each channel.

The transmission step also comprises a multiplexing step that generates an optical division multiplexing signal by multiplexing the shaped and encoded optical pulse signal and optical wavelength division multiplexing signal.

The reception step comprises a branching step that divides the optical division multiplexing signal into an optical code division multiplexing reception signal and an optical wavelength division multiplexing reception signal.

The optical code division multiplexing signal extraction step is constituted comprising a decoding step, a time waveform restoration step and a first threshold value judgment step. The decoding step is a step that generates a decoded optical code division multiplexing reception signal by decoding the optical code division multiplexing reception signal by using the same code as the time-spreading/wavelength-hopping code for each channel. The time waveform restoration step is a step that generates a reproduced optical pulse signal by restoring the shaped optical pulse signal component contained in the decoded optical code division multiplexing reception signal. The first threshold value judgment step is a step that extracts only the autocorrelation waveform component of the optical pulse signal from the reproduced optical pulse signal.

The optical wavelength division multiplexing signal extraction step is constituted comprising a wavelength division step that generates an optical wavelength division signal for each channel through wavelength division of the optical wavelength division multiplexing reception signal and a second threshold value judgment step that extracts the optical wavelength division multiplexing signal by performing a threshold value judgment for the optical wavelength division signal.

Further, a characteristic of the first invention is that the optical code division multiplexing signal generation step comprises a time waveform shaping step that generates a shaped and encoded optical pulse signal by shaping the time waveform of the encoded optical pulse signal. Further, a characteristic of the first invention is that the optical code division multiplexing signal extraction step comprises a time waveform restoration step of generating a reproduced optical pulse signal by restoring the shaped optical pulse signal component contained in the decoded optical code division multiplexing reception signal.

The optical division multiplexing transmission and reception method of the first invention is implemented by the following optical division multiplexing transmission and reception device. That is, the optical division multiplexing transmission and reception device that implements the optical division multiplexing transmission and reception method of the first invention comprises a transmission section that comprises in parallel an optical code division multiplexing signal generation signal and an optical wavelength division multiplexing signal generation section, and a reception section that comprises in parallel an optical code division multiplexing signal extraction section and an optical wavelength division multiplexing signal extraction section.

The optical code division multiplexing signal generation step is executed by the optical code division multiplexing signal generation section. The optical code division multiplexing signal generation section comprises an encoder and a wavelength disperser. The encoder generates an encoded optical pulse signal by encoding the optical pulse signal of each channel by allocating time-spreading/wavelength-hopping code that is different for each channel. Further, the wavelength disperser generates a shaped and encoded optical pulse signal by shaping the time waveform of the encoded optical pulse signal.

The optical wavelength division multiplexing signal generation step is executed by the optical wavelength division multiplexing signal generation section. The optical wavelength division multiplexing signal generation section generates an optical wavelength division multiplexing signal by allocating a different wavelength to each channel.

The transmission section further comprises a multiplexer that generates an optical division multiplexing signal by multiplexing a shaped and encoded optical pulse signal and an optical wavelength division multiplexing signal.

The reception section comprises a de-multiplexer that divides the received optical division multiplexing signal into an optical code division multiplexing reception signal and an optical wavelength division multiplexing reception signal.

The optical code division multiplexing signal extraction step is executed by the optical code division multiplexing signal extraction section. The optical code division multiplexing signal extraction section comprises a decoder, an inverse wavelength disperser and a first threshold value judgment section. The decoder decodes the optical code division multiplexing reception signal by using the same code as the time-spreading/wavelength-hopping code used during encoding for each channel and generates a decoded optical code division multiplexing reception signal. The inverse wavelength disperser performs wavelength dispersion in which absolute values are equal and codes are reversed with respect to the dispersion values of the abovementioned wavelength disperser. That is, a reproduced optical pulse signal is generated by restoring the shaped optical pulse signal component contained in the decoded optical code division multiplexing reception signal. The first threshold value judgment section extracts only the autocorrelation waveform component of the optical pulse signal from the reproduced optical pulse signal.

The optical wavelength division multiplexing signal extraction step is executed by the optical wavelength division multiplexing signal extraction section. The optical wavelength division multiplexing signal extraction section comprises a wavelength de-multiplexer that generates an optical wavelength division signal for each channel through wavelength division of the optical wavelength division multiplexing reception signal and a second threshold value judgment section that extracts an optical wavelength division multiplexing signal by performing a threshold value judgment on the optical wavelength division signal.

Further, the characteristic of the optical division multiplexing transmission and reception device that implements the optical division multiplexing transmission and reception method of the first invention is that the optical code division multiplexing signal generation section comprises a wavelength disperser that performs wavelength dispersion of the encoded optical pulse signal. A further characteristic is that the optical code division multiplexing signal extraction section comprises an inverse wavelength disperser that performs wavelength dispersion in which absolute values are equal and positive and negatives codes are reversed with respect to the dispersion values of the abovementioned wavelength disperser. Here, the time waveform shaping step is performed by the wavelength disperser and the time waveform restoration step is performed by the inverse wavelength disperser.

The optical division multiplexing transmission and reception method of the second invention comprises a transmission step that comprises in parallel an optical code division multiplexing signal generation step and an optical time division multiplexing signal generation step, and a reception step that comprises in parallel an optical code division multiplexing signal extraction step and an optical time division multiplexing signal extraction step.

The optical code division multiplexing signal generation step comprises an encoding step and a time waveform shaping step. The encoding step is a step that generates an encoded optical pulse signal by encoding the optical pulse signal by using time-spreading/wavelength-hopping code that is different for each channel. The time waveform shaping step is a step that generates a shaped and encoded optical pulse signal by shaping the time waveform of the encoded optical pulse signal.

The optical time division multiplexing signal generation step is a step that generates an optical time division multiplexing signal by allocating a time slot that is different for each channel.

The transmission step further comprises a multiplexing step that generates an optical division multiplexing signal by multiplexing the shaped and encoded optical pulse signal and the optical time division multiplexing signal.

The reception step comprises a branching step that divides the optical division multiplexing signal into an optical code division multiplexing reception signal and an optical time division multiplexing reception signal.

The optical code division multiplexing signal extraction step is constituted comprising a decoding step, a time waveform restoration step and a first threshold value judgment step. The decoding step is a step that generates a decoded optical code division multiplexing reception signal by decoding the optical code division multiplexing reception signal by using the same code as the time-spreading/wavelength-hopping code for each channel. The time waveform restoration step is a step that generates a reproduced optical pulse signal by restoring the shaped optical pulse signal component contained in the decoded optical code division multiplexing reception signal. The first threshold value judgment step is a step that extracts only the autocorrelation waveform component of the optical pulse signal from the reproduced optical pulse signal.

The optical time division multiplexing signal extraction step is constituted comprising a time gate step that divides the optical time division signal for each channel with respect to the optical time division multiplexing reception signal and a second threshold value judgment step that extracts the optical time division multiplexing signal by performing a threshold value judgment on the optical time division signal.

Further, a characteristic of the second invention is that the optical code division multiplexing signal generation step comprises a time waveform shaping step that generates a shaped and encoded optical pulse signal by shaping the time waveform of the encoded optical pulse signal. A further characteristic is that the optical code division multiplexing signal extraction step comprises a time waveform restoration step that generates a reproduced optical pulse signal by restoring the shaped optical pulse signal component contained in the decoded optical code division multiplexing reception signal.

The optical division multiplexing transmission and reception method of the second invention is implemented by the following optical division multiplexing transmission and reception device. That is, the optical division multiplexing transmission and reception device that implements the optical division multiplexing transmission and reception method of the second invention comprises a transmission section that comprises in parallel an optical code division multiplexing signal generation section and an optical time division multiplexing signal generation section, and a reception section that comprises in parallel an optical code division multiplexing signal extraction section and an optical time division multiplexing signal extraction section.

The optical code division multiplexing signal generation step is executed by the optical code division multiplexing signal generation section. The optical code division multiplexing signal generation section comprises an encoder and wavelength de-multiplexer. The encoder generates an encoded optical pulse signal by encoding the optical pulse signal of each channel by allocating different time-spreading/wavelength-hopping code for each channel. Further, the wavelength de-multiplexer generates a shaped and encoded optical pulse signal by shaping the time waveform of the encoded optical pulse signal.

The optical time division multiplexing signal generation step is executed by the optical time division multiplexing signal generation section. The optical time division multiplexing signal generation section generates an optical time division multiplexing signal by allocating a different time slot to each channel.

The transmission section comprises a multiplexer that generates an optical division multiplexing signal by multiplexing the shaped and encoded optical pulse signal and the optical time division multiplexing signal.

The reception section comprises a de-multiplexer that divides the received optical division multiplexing signal into an optical code division multiplexing reception signal and an optical time division multiplexing reception signal.

The optical code division multiplexing signal extraction step is executed by the optical code division multiplexing signal extraction section. The optical code division multiplexing signal extraction section comprises a decoder, an inverse wavelength disperser and a first threshold value judgment section. The decoder decodes the optical code division multiplexing reception signal by using the same code as the time-spreading/wavelength-hopping code used during encoding for each channel and generates a decoded optical code division multiplexing reception signal. The inverse wavelength disperser performs wavelength dispersion in which absolute values are equal and codes are reversed with respect to the dispersion values of the abovementioned wavelength disperser. That is, a reproduced optical pulse signal is generated by restoring the shaped optical pulse signal component contained in the decoded optical code division multiplexing reception signal. The first threshold value judgment section extracts only the autocorrelation waveform component of the optical pulse signal from the reproduced optical pulse signal.

The optical time division multiplexing signal extraction step comprises an optical time division signal separation section that separates the optical time division signal for each channel with respect to the optical time division multiplexing reception signal and a second threshold value judgment section that extracts an optical time division multiplexing signal by performing a threshold value judgment on the optical time division signal.

Further, the characteristic of the optical division multiplexing transmission and reception device that implements the optical division multiplexing transmission and reception method of the second invention is that the optical code division multiplexing signal generation section comprises a wavelength disperser that performs wavelength dispersion of the encoded optical pulse signal. A further characteristic is that the optical code division multiplexing signal extraction section comprises an inverse wavelength disperser that performs wavelength dispersion in which absolute values are equal and positive and negative codes are reversed with respect to the dispersion values of the abovementioned wavelength disperser. Here, the time waveform shaping step is performed by the wavelength disperser and the time waveform restoration step is performed by the inverse wavelength disperser.

Further, the encoder and decoder of the optical division multiplexing transmission and reception device of the first and second inventions are preferably constituted comprising a Fiber Bragg grating.

Furthermore, the first and second threshold value judgment sections of the optical division multiplexing transmission and reception device of the first and second inventions are preferably constituted comprising a nonlinear fiber loop.

Further, the first and second threshold value judgment sections of the optical division multiplexing transmission and reception device of the first and second inventions are preferably constituted comprising a light saturable absorber.

According to the optical division multiplexing transmission and reception method of the first invention, the shaped and encoded optical pulse signal and optical wavelength division multiplexing signal are generated in the transmission step and an optical division multiplexing signal is generated as a result of the shaped and encoded optical pulse signal and optical wavelength division multiplexing signal being mixed by the multiplexing step. The optical division multiplexing signal is separated into the optical code division multiplexing reception signal and optical wavelength division multiplexing reception signal by the branching step that the reception step comprises.

An autocorrelation waveform component that corresponds with the optical pulse signal rendered by playing back the optical pulse signal that has been sent encoded for each channel is extracted from the optical code division multiplexing reception signal and an optical wavelength division multiplexing signal is extracted for each channel from the optical wavelength division multiplexing reception signal.

The abovementioned optical division multiplexing signal comprises a shaped and encoded optical pulse signal and an optical wavelength division multiplexing signal and the optical code division multiplexing reception signal and optical wavelength division multiplexing reception signal obtained through division of the optical division multiplexing signal both comprise the shaped and encoded optical pulse signal and optical wavelength division multiplexing signal.

Therefore, in order to extract the autocorrelation waveform component from the optical code division multiplexing reception signal, the optical wavelength division multiplexing signal component contained in the optical code division multiplexing reception signal must be removed. Further, in order to extract the optical wavelength division multiplexing signal from the optical wavelength division multiplexing reception signal, the optical code division multiplexing reception signal component must be removed. Hereinafter, the optical wavelength division multiplexing reception signal component is also called the optical pulse signal originating in the WDM channel and the optical code division multiplexing reception signal is also called the optical pulse signal originating in the OCDM channel.

On the other hand, with the optical division multiplexing transmission and reception method of the second invention, a shaped and encoded optical pulse signal and an optical time division multiplexing signal are generated in the transmission step and an optical division multiplexing signal is generated as a result of the shaped and encoded optical pulse signal and optical time division multiplexing signal being mixed by the multiplexing step. The optical division multiplexing signal is divided into an optical code division multiplexing reception signal and an optical time division multiplexing reception signal by the branching step that the reception step comprises.

An autocorrelation waveform component that corresponds with the optical pulse signal rendered by playing back the optical pulse signal that has been sent encoded for each channel is extracted from the optical code division multiplexing reception signal and an optical time division multiplexing signal is extracted for each channel from the optical time division multiplexing reception signal.

The abovementioned optical division multiplexing signal comprises a shaped and encoded optical pulse signal and an optical time division multiplexing signal and the optical code division multiplexing reception signal and optical time division multiplexing reception signal obtained through division of the optical division multiplexing signal both comprise the shaped and encoded optical pulse signal and optical time division multiplexing signal.

Therefore, in order to extract the autocorrelation waveform component from the optical code division multiplexing reception signal, the optical time division multiplexing signal component contained in the optical code division multiplexing reception signal must be removed. Further, in order to extract the optical time division multiplexing signal from the optical time division multiplexing reception signal, the optical pulse signal originating in the OCDM channel must be removed. Hereinafter, the optical time division multiplexing reception signal component is also called the OTDM channel.

The characteristic of the optical division multiplexing transmission and reception method of the first and second inventions is that the optical code division multiplexing signal generation step included in the transmission step includes a time waveform shaping step that generates a shaped and encoded optical pulse signal by shaping the time waveform of the encoded optical pulse signal. A further characteristic is that the optical code division multiplexing signal extraction step included in the reception step comprises a time waveform restoration step that generates a restored encoded optical pulse signal that is similar to the encoded optical pulse signal waveform by restoring the waveform of the shaped and encoded optical pulse signal.

Hence, the encoded optical pulse signal is transmitted after the time waveform has been shaped by the time waveform shaping step. In the reception step, the encoded optical pulse signal that has been shaped and transmitted is generated as a restored encoded optical pulse signal that is similar to the encoded optical pulse signal waveform as a result of being restored by the time waveform restoration step.

However, in the optical division multiplexing transmission and reception method of the first invention, a time waveform shaping step is not included in the optical wavelength division multiplexing signal generation step. As a result, in the reception step, the time waveform of the optical wavelength division multiplexing signal component contained in the optical wavelength division multiplexing reception signal is not shaped. The time waveform of the optical wavelength division multiplexing signal component is shaped by the inverse wavelength disperser used in the time waveform restoration step of the optical code division multiplexing signal extraction step.

That is, the optical pulse signal originating in the WDM channel does not undergo the time waveform shaping step during transmission and, therefore, the optical pulse signal originating in the WDM channel contained in the optical wavelength division multiplexing reception signal does not undergo time waveform shaping. The optical pulse signal originating in the WDM channel undergoes time waveform shaping at this stage because the time waveform restoration step is executed even when the optical pulse signal does not undergo time waveform shaping. On the other hand, the encoded optical pulse signal is transmitted after the time waveform has been shaped and the shaped time waveform is restored during reception.

As described hereinabove, in the reception step, even when an optical pulse signal originating in the WDM channel generated in the optical wavelength division multiplexing signal generation step is mixed in with the encoded optical pulse signal that is transmitted after being shaped, because the time waveform of the optical pulse signal originating in the WDM channel undergoes shaping by the inverse wavelength disperser that is used in the time waveform restoration step, the optical pulse signal is expanded over the time axis. As a result, the peak value of the optical pulse signal originating in the WDM channel drops and can be removed by the first threshold value judgment step.

Likewise, in the optical division multiplexing transmission and reception method of the second invention, a time waveform shaping step is not included in the optical time division multiplexing signal generation step. As a result, in the reception step, the time waveform of the optical pulse signal originating in the OTDM channel contained in the optical code division multiplexing reception signal is not shaped. The time waveform of the optical pulse signal originating in the OTDM channel is shaped by the inverse wavelength disperser that is used in the time waveform restoration step of the optical code division multiple signal extraction step.

That is, the optical pulse signal originating in the OTDM channel does not undergo the time waveform shaping step during transmission and, therefore, the optical pulse signal originating in the OTDM channel contained in the received optical code division multiplexing reception signal does not undergo time waveform shaping. The optical pulse signal originating in the OTDM channel undergoes time waveform shaping at this stage because the time waveform restoration step is executed even when the optical pulse signal does not undergo time waveform shaping. On the other hand, the encoded optical pulse signal is transmitted after the time waveform has been shaped and the shaped time waveform is restored during reception.

As described hereinabove, in the reception step, even when the optical pulse signal originating in the OTDM channel generated in the optical time division multiplexing signal generation step is mixed in with the encoded optical pulse signal that has been shaped and transmitted, the time waveform of the optical pulse signal originating in the OTDM channel undergoes shaping by the inverse wavelength disperser that is used in the time waveform restoration step and the optical pulse signal is expanded over the time axis. As a result, the peak value of the optical pulse signal originating in the OTDM channel drops and can be removed by the first threshold value judgment step.

Therefore, it can be seen that, according to the optical division multiplexing transmission and reception method of the first invention, OCDM communication and WDM communication can be implemented in parallel. Further, it can be seen that, according to the optical division multiplexing transmission and reception method of the second invention, OCDM communication and OTDM communication can be implemented in parallel. Based on this fact, an optical multiplexing transmission and reception device to which an OCDM channel has been added and an optical multiplexing transmission and reception method can be implemented without changing the usage wavelength bandwidth of the existing WDM channel. Further, an optical multiplexing transmission and reception device to which an OCDM channel has been added and an optical multiplexing transmission and reception method can be implemented without changing the time slot allocated to the existing OTDM channel.

Furthermore, if the encoder and decoder of the optical division multiplexing transmission and reception device of the first and second inventions are constituted comprising a Fiber Bragg grating, the transmission lines of the optical division multiplexing transmission and reception device are constituted by optical fiber and, therefore, a Fiber Bragg grating formed by using optical fiber has a form that is useful for connection. That is, an optical circulator, as will be described subsequently, is used to form the encoder and decoder, and, therefore, a Fiber Bragg grating is very useful for the connection with the optical circulator.

Furthermore, if the first and second threshold value judgment sections of the optical division multiplexing transmission and reception device of the first and second invention are constituted comprising a nonlinear fiber loop, the threshold value judgment is performed by using the nonlinear optical effect and, therefore, the threshold value judgment operation is executed at a remarkably high speed in comparison with a threshold value judgment operation using an electrical procedure. In particular, when the communication speed increases, the merit of performing the threshold value judgment by using a nonlinear optical effect rather than an electrical procedure is large.

Further, the first and second threshold value judgment sections of the optical division multiplexing transmission and reception device of the first and second inventions is preferably constituted comprising a light saturable absorber. It is confirmed that the threshold value judgment section that uses a light saturable absorber possesses resistance to light destruction and mechanical destruction as well as water resistance and has a very long lifespan. Therefore, the threshold value judgment section that uses a light saturable absorber is preferably used in the optical multiplexing transmission and reception device.

BRIEF DESCRIPTION OF THE DRAWINGS

The foregoing and other objects, features and advantages of the present invention will be better understood from the following description taken in connection with the accompanying drawings, in which:

FIG. 6 serves to illustrate the wavelength dispersion and inverse wavelength dispersion with respect to an optical pulse;

FIG. 7 shows a time waveform of an optical pulse signal outputted from an intensity modulator;

DESCRIPTION OF THE PREFERRED EMBODIMENTS

Figure 1:
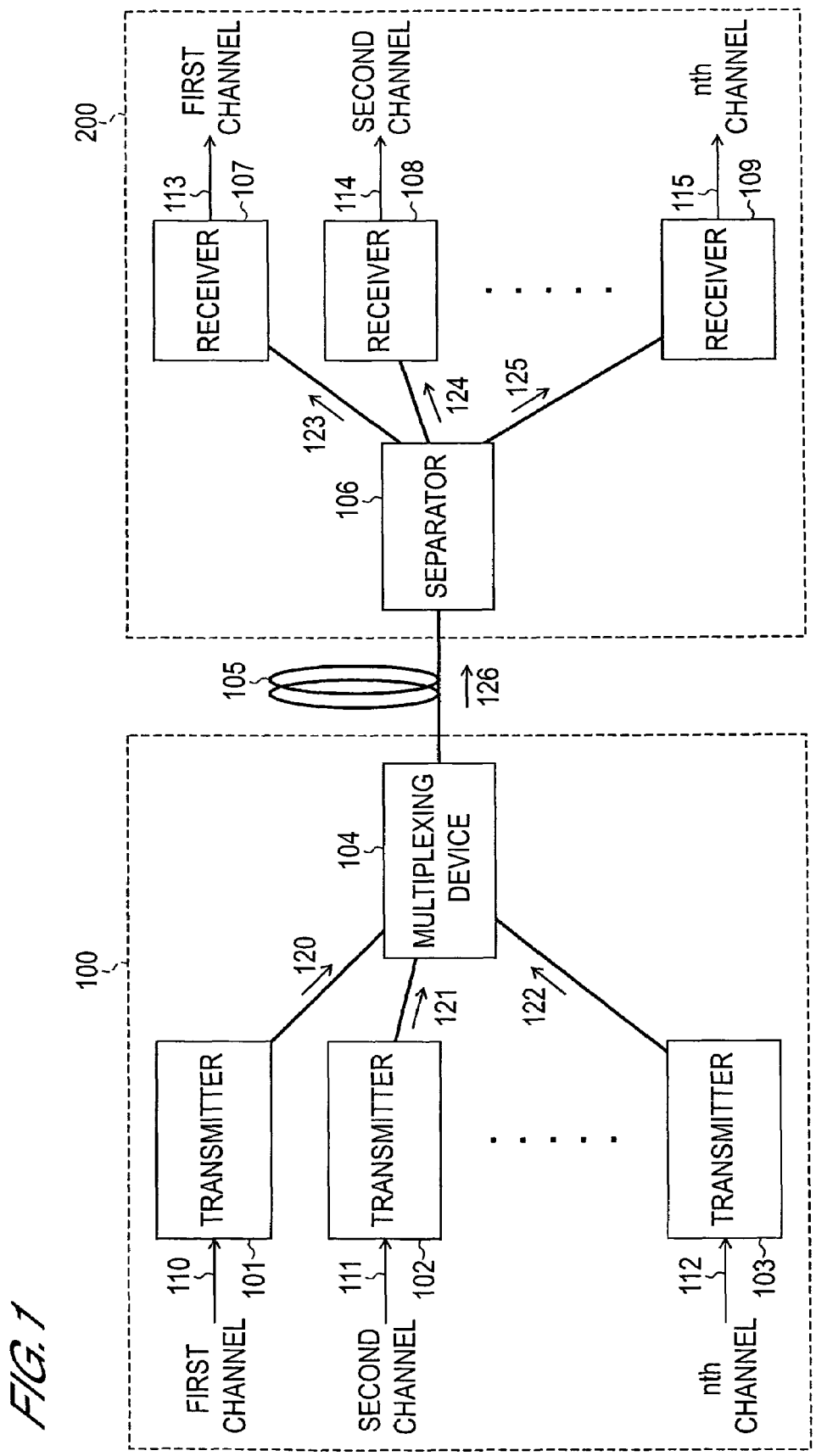
FIG. 1 is a schematic block constitutional view of the optical division multiplexing transmission and reception device.
Figure 2A:
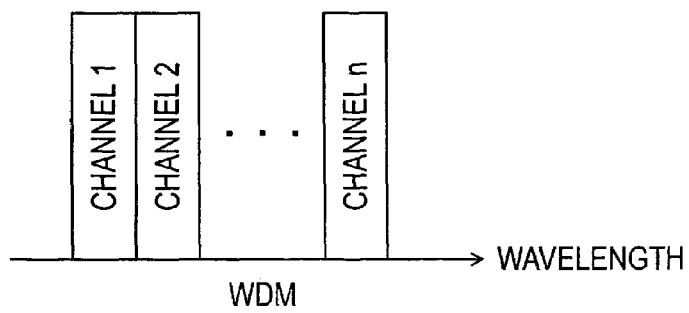
FIG. 2 serves to illustrate the bandwidth that is allocated to the channels in WDM and OTDM.
Figure 2B:
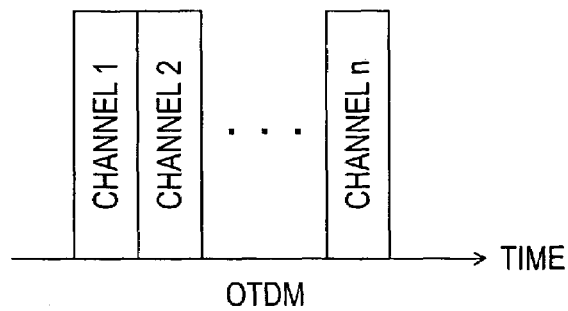
Figure 3A:
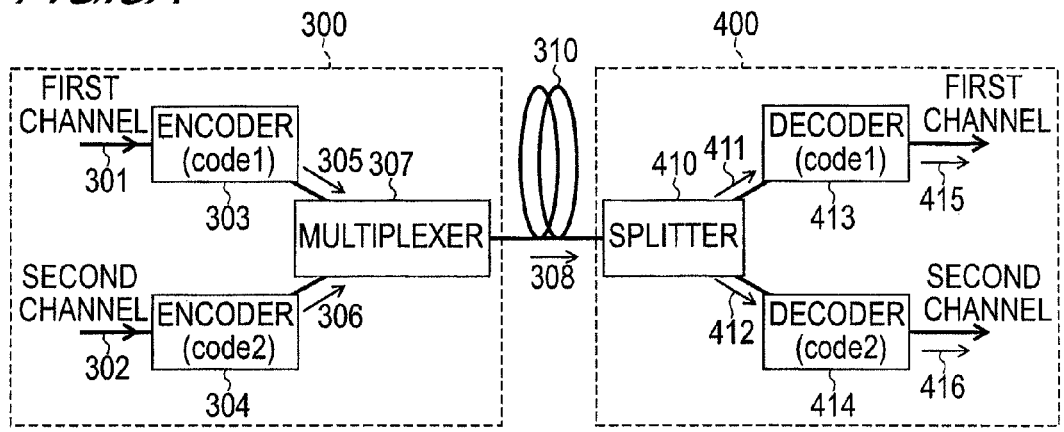
FIG. 3 serves to illustrate the operating principles of time spreading wavelength hopping OCDM.
Figure 3B:
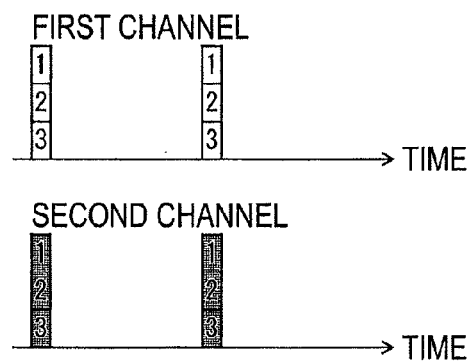
Figure 3C:
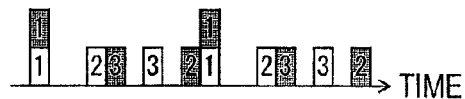
Figure 3D:
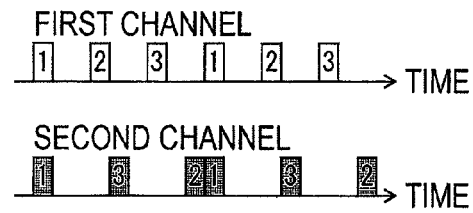
Figure 3E:
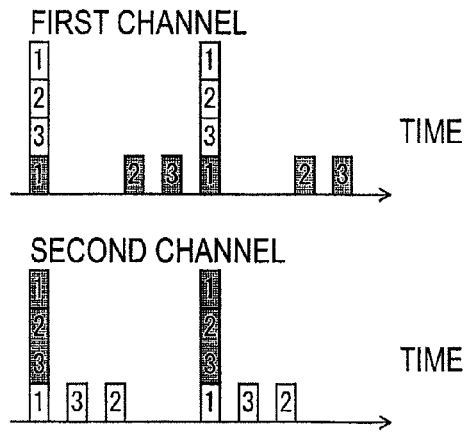

Embodiments of the present invention will be described hereinbelow with reference to the drawings. Further, each of the drawings shows a constitutional example of the present invention. The cross-sectional shape and dispositional relationship and so forth of each of the constituent elements are only schematically shown to the extent of allowing an understanding of the invention and the present invention is not limited to or by the illustrated examples. Further, although specified materials and conditions and so forth are employed in the following description, these materials and conditions are only one of the preferred examples and, therefore, the present invention is not limited to such materials and conditions in any way. Further, the same constituent elements in the drawings are shown with the same numbers assigned thereto, whereby repetition in the description is avoided.

In the drawings shown hereinbelow, the paths of the optical pulse signal such as optical fibers or the like are shown with bold lines and the paths of electrical signals are shown with thin lines. Further, the numbers appended to the bold lines and thin lines indicate not only the paths but also sometimes signify optical pulse signals or electrical signals that are propagated by the respective paths.

First Embodiment

An optical division multiplexing transmission and reception method of the first embodiment and a device for implementing the optical division multiplexing transmission and reception method will be described with reference to FIG. 5. The optical division multiplexing transmission and reception device comprises a transmission section 500 that comprises in parallel an optical code division multiplexing signal generation section 510 and an optical wavelength division multiplexing signal generation section 530 and a reception section 600 that comprises in parallel an optical code division multiplexing signal extraction section 610 and an optical wavelength division multiplexing signal extraction section 630.

In the following description, the optical code division multiplexing signal generation section is abbreviated to the OCDM signal generation section, the optical wavelength division multiplexing signal generation section is abbreviated to the WDM signal generation section, the optical code division multiplexing signal extraction section is abbreviated to the OCDM signal extraction section, and the optical wavelength division multiplexing signal extraction section is abbreviated to the WDM signal extraction section.

The optical code division multiplexing signal generation step is executed by an OCDM signal generation section 510. That is, the OCDM signal generation section 510 first executes an encoding step that generates an encoded optical pulse signal by encoding an optical pulse signal by using different time-spreading/wavelength-hopping code for each channel. Thereafter, a time waveform shaping step that generates a shaped and encoded optical pulse signal by shaping the time waveform of the encoded optical pulse signal is executed.

Further, the optical wavelength division multiplexing signal generation step is implemented by the WDM signal generation section 530. The WDM signal generation section 530 generates an optical wavelength division multiplexing signal by allocating a different wavelength to each channel.

Figure 5:
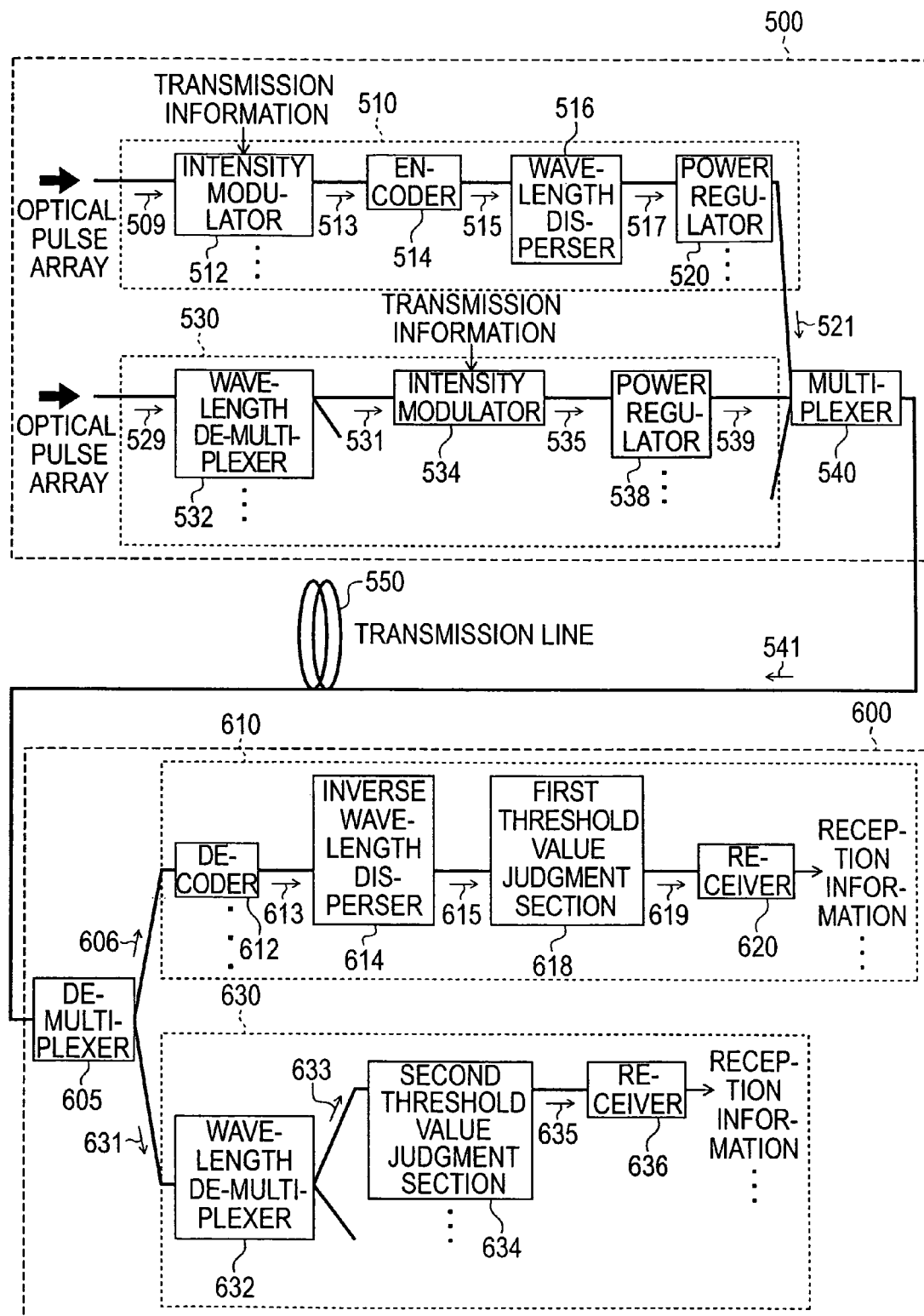
FIG. 5 is a schematic block constitutional view of the optical division multiplexing transmission and reception device of the first embodiment.

The OCDM signal generation section 510 that executes the optical code division multiplexing signal generation step and the WDM signal generation section 530 that executes the optical wavelength division multiplexing signal generation step are provided in parallel as shown in FIG. 5.

In FIG. 5, only one channel's worth of each of the OCDM signal generation section 510 and the WDM signal generation section 530 is shown and the other channels are omitted. That is, generally, OCDM signal generation sections 510 are disposed in parallel in a quantity corresponding to the number of OCDM channels and WDM signal generation sections 530 are disposed in parallel in a quantity corresponding to the number of WDM channels. The OCDM signal generation sections 510 that are disposed in parallel in a quantity corresponding to the number of OCDM channels only have different codes set for the encoder, the other constituent elements being the same. However, the wavelength dispersion characteristic of a wavelength disperser 516 may be the same for each channel or different for each channel. Further, the WDM signal generation sections 530 that are disposed in parallel in a quantity corresponding to the number of WDM channels are constituted by the same constituent elements for each channel.

The following description sometimes illustrates two OCDM channels and four WDM channels for the sake of expediency. However, it is understood that the following description is valid irrespective of the channel numbers.

The transmission section 500 further comprises a multiplexer 540 that generates an optical division multiplexing signal by multiplexing the shaped and encoded optical pulse signal and the optical wavelength division multiplexing signal. On the other hand, the reception section 600 comprises a de-multiplexer 605 that divides the received optical division multiplexing signal into an optical code division multiplexing reception signal and an optical wavelength division multiplexing reception signal.

The optical code division multiplexing signal extraction step is executed by an OCDM signal extraction section 610. A decoder 612 of the OCDM signal extraction section 610 decodes the optical code division multiplexing reception signal by using the same code as the time-spreading/wavelength-hopping code for each channel, and generates a decoded optical code division multiplexing reception signal. The shaped optical pulse signal component contained in the decoded optical code division multiplexing reception signal is decoded by an inverse wavelength disperser 614 to generate a reproduced optical pulse signal. Only the autocorrelation waveform component of the optical pulse signal constituting the transmission signal is extracted from the reproduced optical pulse signal by a first threshold value judgment section 618.

The wavelength disperser 516 that the OCDM signal generation section 510 comprises and the inverse wavelength disperser 614 that the OCDM signal extraction section 610 comprises have dispersion values for which the absolute values are equal and the positive and negative codes are reversed. That is, the time waveform shaping step is performed by the wavelength disperser 516 and the time waveform restoration step is performed by the inverse wavelength disperser 614. Further, the OCDM signal extraction section 610 comprises the first threshold value judgment section 618 for extracting only the autocorrelation waveform component from the reproduced optical pulse signal.

The optical wavelength division multiplexing signal extraction step is executed by the WDM signal extraction section 630. The WDM signal extraction section 630 extracts an optical wavelength division multiplexing signal for each channel from the optical wavelength division multiplexing reception signal by means of a second threshold value judgment section 634 that the WDM signal extraction section comprises.

The constitution of the OCDM channel and WDM channel will be described in detail with reference to FIG. 5. First, the constitution of the OCDM signal generation section 510 of the OCDM channel of the transmission section 500 will be described. The OCDM signal generation section 510 has a plurality of OCDM channels installed in parallel. Of these channels, the first OCDM channel will be described representatively. Because the other OCDM channels also have the same structure, a description of the other OCDM channels is omitted here.

The OCDM signal generation section 510 is constituted comprising an intensity modulator 512, an encoder 514, a wavelength disperser 516, and a power regulator 520. The difference for each channel is the code that is set for the encoder. Because each channel is identified by the difference in the codes, OCDM is an optical multiplexing transmission and reception method in which the codes serve as identifiers.

First, an optical pulse array 509 is inputted to the intensity modulator 512, which is a constituent element of the OCDM signal generation section 510. As will be described subsequently, the optical pulses constituting the optical pulse array 509 contain light of the wavelengths $\lambda_1, \lambda_2, \lambda_3,$ and $\lambda_4$. When the optical pulses contain light of the wavelengths $\lambda_1, \lambda_2, \lambda_3,$ and $\lambda_4$, this signifies a state where optical pulses whose center wavelengths are $\lambda_1, \lambda_2, \lambda_3,$ and $\lambda_4$ respectively exist stacked on the same time axis.

The intensity modulator 512 has a function for converting a binary digital electrical signal, which is transmission information on the first OCDM channel, into an RZ-formatted optical pulse signal. An EA modulator, for example, can be used as the intensity modulator 512. The optical pulse array 509 that is inputted to the intensity modulator 512 is outputted as an optical pulse signal 513 that reflects the transmission information of the first OCDM channel.

Hereinafter, the expression 'optical pulse signal' will be used only in cases where an array of optical pulses that reflect a binary digital electrical signal that is obtained by subjecting an optical pulse array to optical modulation and converting an electrical pulse signal into an optical pulse signal is intended. On the other hand, the expression 'optical pulse array' is used to indicate a whole body of optical pulses that are in a row at regular fixed intervals (time slots) on the time axis.

The optical pulse signal 513 is inputted to the encoder 514 and outputted as an encoded optical pulse signal 515 after undergoing time-spreading/wavelength-hopping encoding. That is, the encoding step is implemented by the encoder 514. Code for identifying the first OCDM channel is set for the encoder 514 and this code is the same as the code that is set for the decoder 612 of the reception section 600 (described subsequently). The time spreading wavelength hopping encoding has already been described and, therefore, the same description will not be repeated.

Figure 4A:
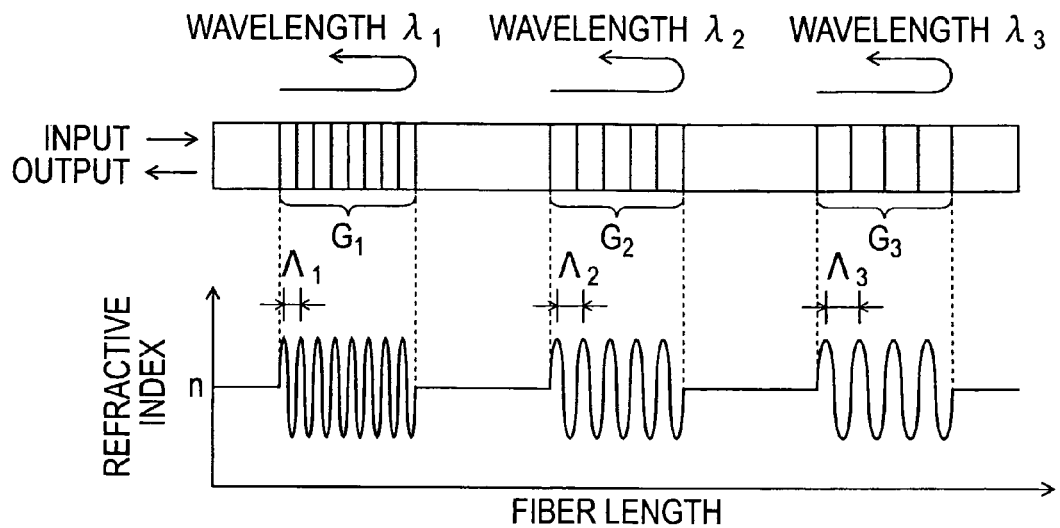
FIG. 4 serves to illustrate the optical encoder.
Figure 4B:
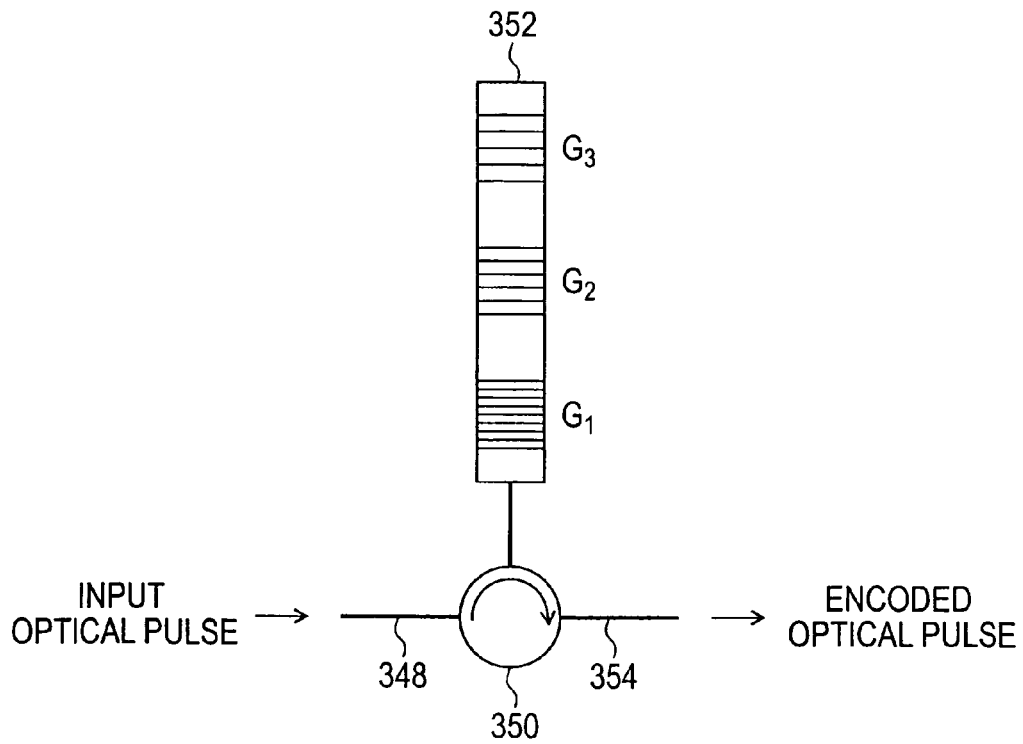

The abovementioned FBG is used as the encoder or decoder. More specifically, the optical encoder described with reference to FIG. 4 can be used as an encoder or decoder. Further, in addition to the FBG, an element with a transversal-type filter constitution or the like can also be used as the encoder or decoder. However, in the following description, the description is made on the premise of an encoder and a decoder that are constituted by using a FBG. In both cases, when an optical encoder constituted by using an optical circulator as shown in FIG. 4 is used as the encoder or decoder as mentioned earlier, an FBG that permits a straightforward connection with the optical circulator is very useful.

The encoded optical pulse signal 515 is inputted to the wavelength disperser 516, whereupon the time waveform of the encoded optical pulse signal 515 is shaped such that same is outputted as a shaped and encoded optical pulse signal 517. That is, a time waveform shaping step is executed by the wavelength disperser 516. A commercial wavelength dispersion device such as dispersion-compensating optical fiber or a Fiber Bragg grating with a chirped refractive index cycle structure can be used as the wavelength disperser.

Here, the wavelength dispersion and inverse wavelength dispersion of the optical pulses constituting the optical pulse signal will be described with reference to FIGS. 6A to 6C. The upper row of FIGS. 6A to 6C shows waveforms with respect to the time axis of the optical pulses and the lower row of FIGS. 6A to 6C shows waveforms with respect to the wavelength axis of the optical pulses. That is, the lower row shows the wavelength spectral of the optical pulses. For each of FIGS. 6A to 6C, the waveforms shown by solid lines represent the intensity of the O/E field spectral and the broken lines show the envelope of the intensity waveform of the O/E field spectral with respect to the time axis.

FIG. 6A shows the optical pulses before same are inputted to the wavelength disperser. FIG. 6B shows the optical pulses after passing through a wavelength disperser with a normal dispersing characteristic. Although the intensity and half value width of the wavelength spectrum have not changed, the half value width of the time waveform is widened. Here, the half value width of the time waveform is called the half value width of the envelope of the intensity waveform of the O/E field spectral with respect to the time axis. The half value widths with respect to the shape of the upper half and lower half of the envelope of the intensity waveform of the O/E field spectral with respect to the time axis are equal and, therefore, the half value width is called the half value width of the time waveform.

The reason for the expansion in the half value width of the time waveform is that, when the optical pulses pass through the middle of a wavelength dispersing medium with a normal dispersing characteristic that constitutes a wavelength disperser, the larger the long wavelength component of the light constituting the optical pulses, the greater the propagation speed. That is, this is because the optical pulses spread out on the time axis as a result of the advance of the phase as the wavelength component of the light grows longer while the optical pulses are passing through the wavelength dispersion medium that constitutes the wavelength disperser. Here, the wavelength dispersion medium is known as the core of the dispersion-compensating optical fiber or the core where the Fiber Bragg grating with the chirped refractive index cycle structure is formed, or the like, the core being used as the wavelength disperser, for example.

FIG. 6C shows optical pulses after passing through a wavelength disperser with an abnormal dispersion characteristic. In this case also, the half value width of the time waveform of the optical pulses is widened as per the optical pulses shown in FIG. 6B. This is because, contrary to FIG. 6B, when the optical pulses pass through the middle of a wavelength dispersion medium with an abnormal dispersion characteristic, the phase speed increases as the wavelength component of the light constituting the optical pulses grows shorter.

Here, the phenomenon whereby the phase speed increases with increased wavelength is known as normal dispersion and the phenomenon whereby the phase speed drops with increased wavelength is known as abnormal dispersion. Further, a difference in phase speed between light having a unit-wavelength difference is known as the dispersion value of the medium. Further, the dispersion value of normal dispersion represents a positive value while the dispersion value of abnormal dispersion represents a negative value.

The characteristic of the optical division multiplexing transmission and reception method and the device that implements this method of the present invention is as follows. That is, the characteristic is that a shaped and encoded optical pulse signal is generated by shaping the time waveform of the encoded optical pulse signal in the time waveform shaping step that is executed by the wavelength disperser 516 and a restored encoded optical pulse signal similar to the encoded optical pulse signal waveform is generated by restoring the shaped and encoded optical pulse signal in the time waveform restoration step that is executed by the inverse wavelength disperser 614. Therefore, the absolute values of the dispersion value of the wavelength disperser 516 and the inverse wavelength disperser 614 must be equal and the codes must be reversed.

Furthermore, the shaped and encoded optical pulse signal 517 is inputted to the power regulator 520, and the power of the shaped and encoded optical pulse signal 517 is regulated and outputted as a shaped and encoded optical pulse signal 521. The power regulator 520 is installed to make uniform the intensity of the shaped and encoded optical pulse signal of each OCDM channel. When the intensity of the shaped and encoded optical pulse signal differs greatly between each OCDM channel, there is the possibility that the mutual correlation waveform component contained in the decoded optical pulse signal decoded by the decoder of the reception section 600 will be the same as or greater than the autocorrelation waveform component. When this occurs, there is the possibility that the first threshold value judgment section will not be able to extract only the autocorrelation waveform component.

As described hereinabove, the characteristic of the present invention is that the transmission step comprises an optical code division multiplexing signal generation step that is executed by the encoder 514 and a time waveform shaping step that is executed by the wavelength disperser 516.

The constitution of the WDM signal generation section 530 of the WDM channel of the transmission section 500 will be described next with reference to FIG. 5. The WDM signal generation section 530 has a plurality of WDM channels installed in parallel. Here also, the first WDM channel is described representatively at the same time as describing the constitution of the OCDM signal generation section 510 mentioned above. Because other WDM channels also have the same structure, a description thereof is omitted.

The WDM signal generation section 530 is constituted comprising a wavelength de-multiplexer 532, an intensity modulator 534, and a power regulator 538. First, an optical pulse array 529 is inputted to the wavelength de-multiplexer 532 that is a constituent element of the WDM signal generation section 530. Here also, the optical pulse array 529 contains light of wavelengths $\lambda_1$, $\lambda_2$, $\lambda_3$, and $\lambda_4$ as per the case of the OCDM channel. Optical pulses of different wavelengths for each WDM channel are distributed by the wavelength de-multiplexer 532. For example, an optical pulse 531 of wavelength $\lambda_1$ is allocated to the first WDM channel. That is, because each WDM channel is identified by the difference in wavelength, WDM is an optical multiplexing transmission and reception method in which the codes serves as identifiers. An AWG or the like, for example, can be used as the wavelength de-multiplexer 532 and the subsequently described wavelength de-multiplexer 632.

The intensity modulator 534 has a function for converting a binary digital electrical signal, which is transmission information on the first WDM channel, into an RZ-formatted optical pulse signal. The intensity modulator 534 is the same as the intensity modulator 512 of the first OCDM channel and the same description will not be repeated here. The optical pulse 531 that is inputted to the intensity modulator 534 is outputted as an optical pulse signal 535 that reflects the transmission information of the first WDM channel. The wavelength of the optical pulse signal 535 is $\lambda_1$.

The optical pulse signal 535 is inputted to the power regulator 538 and the power of the optical pulse signal 535 is regulated and outputted as an optical pulse signal 539. The power regulator 538 is also installed with the same objective as the power regulator 520 provided in the OCDM signal generation section 510.

As mentioned herein above, the shaped and encoded optical pulse signal of the respective OCDM channels and the optical pulse signal of the respective WDM channels are mixed by the multiplexer 540 to form an optical division multiplexing signal 541, which is propagated by a transmission line 550 that is constituted by optical fiber before being sent to the reception section 600. Here, the shaped and encoded optical pulse signal of the respective OCDM channels signifies two channels' worth including the shaped and encoded optical pulse signal 521 of the first OCDM channel and is a shaped and encoded optical pulse signal that is generated by multiplexing the shaped and encoded optical pulse signals of the first and second OCDM channels. Further, the optical pulse signal of the respective WDM channels signifies four channels' worth including the optical pulse signal 539 of the first WDM channel and is an optical wavelength division multiplexing signal that is generated by multiplexing the optical pulse signals of the first to fourth WDM channels. That is, the multiplexing step is executed by the multiplexer 540.

The constitution and function of the reception section 600 will be described next. The reception section 600 comprises the de-multiplexer 605, the OCDM signal extraction section 610 and the WDM signal extraction section 630 and the OCDM signal extraction section 610 and WDM signal extraction section 630 are constituted in parallel. First, the constitution of the OCDM signal extraction section 610 of the OCDM channel will be described. The OCDM signal extraction section 610 has a plurality of OCDM channels installed in parallel. Here also, the first OCDM channel is described representatively as per the description of the OCDM signal generation section 510.

The OCDM signal extraction section 610 is constituted comprising the decoder 612, inverse wavelength disperser 614, the first threshold value judgment section 618, and the receiver 620. The difference for each channel is the code that is set for the decoder. Equal code for each of the corresponding channel in each case is set for the encoder that is installed in each channel of the transmission section 500 and for the decoder that is installed in each channel of the reception section 600.

The optical division multiplexing signal 541 is inputted to the de-multiplexer 605 and divided into an optical code division multiplexing reception signal (hereinafter also abbreviated as 'OCDM reception signal') and an optical wavelength division multiplexing reception signal (hereinafter also abbreviated as 'WDM reception signal'). The optical division multiplexing signal 541 is a signal that is generated as a result of the shaped and encoded optical pulse signal of each OCDM channel and the optical wavelength division multiplexing signal of each WDM channel being mixed by means of the multiplexer 540 and, therefore, both the OCDM reception signal and also the WDM reception signal that are obtained as a result of intensity-dividing the optical division multiplexing signal 541 by means of the de-multiplexer 605 are signals that equally contain the shaped and encoded optical pulse signal of each OCDM channel and the optical wavelength division multiplexing signal of each WDM channel.

An OCDM reception signal 606 that is allocated to the first OCDM channel among the OCDM reception signals that are supplied to the OCDM signal extraction section 610 is inputted to the decoder 612 and outputted decoded as a decoded optical code division multiplexing reception signal (hereinafter also abbreviated as 'decoded OCDM reception signal') 613. The decoded OCDM reception signal 613 is inputted to the inverse wavelength disperser 614 and the shaped and encoded optical pulse signal component contained in the decoded OCDM reception signal 613 is restored and outputted as a reproduced optical pulse signal 615. That is, a time waveform restoration step is executed by the inverse wavelength disperser 614.

Here, although components other than the shaped and encoded optical pulse signal component are also contained in the decoded OCDM reception signal 613, components other than the shaped and encoded optical pulse signal component are processed as noise in the subsequent steps of the first OCDM channel. Therefore, the effective signal outputted from the inverse wavelength disperser 614 is the reproduced optical pulse signal 615. A detailed description of the decoded OCDM reception signal 613 and the shaped and encoded optical pulse signal component and so forth will be provided subsequently.

The reproduced optical pulse signal 615 is inputted to the first threshold value judgment section 618 and, as a result of the first threshold value judgment step being executed, only the autocorrelation waveform component 619 of the optical pulse signal 513 that reflects transmission information on the first OCDM channel is outputted. The autocorrelation waveform component 619 is inputted to the receiver 620 and the autocorrelation waveform component 619 constituting an optical pulse signal is converted (O/E converted) to an electrical pulse signal and acquired by the reception section 600 as reception information on the first OCDM channel. That is, the transmission information on the first OCDM channel transmission that is transmitted from the transmission section 500 is received by the reception section 600 as reception information on the first OCDM channel.

Meanwhile, the WDM reception signal 631 supplied to the WDM signal extraction section 630 will be described. Here also, the first WDM channel will be described representatively similarly to the description of the WDM signal generation section 530. The WDM reception signal 631 that is supplied to the WDM signal extraction section 630 is inputted to the wavelength de-multiplexer 632 and undergoes wavelength division as optical signals of wavelengths that correspond with each WDM channel that are supplied to the second threshold value judgment section 634 of each channel. The optical wavelength division signal 633 of wavelength $\lambda_1$ that is supplied to the second threshold value judgment section 634 of the first WDM channel is received as reception information on the first WDM channel as a result of the second threshold value judgment step being executed and the WDM signal 635 of the first WDM channel being extracted, inputted to the receiver 636 and converted to an electrical pulse signal (O/E converted). That is, the transmission information on the first WDM channel transmitted from the transmission section 500 is received by the reception section 600 as reception information on the first WDM channel.

Here also, as per the OCDM channel case, the optical wavelength division signal 633 of wavelength $\lambda_1$ that is supplied to the second threshold value judgment section 634 also contains a shaped and encoded optical pulse signal component of the OCDM channel. However, the OCDM-channel shaped and encoded optical pulse signal component is processed as noise in subsequent steps of the first WDM channel. A detailed description of the OCDM-channel shaped and encoded optical pulse signal component and so forth will also be provided subsequently.

The optical-signal transmission form of the optical division multiplexing transceiver of the first embodiment will now be described with reference to FIGS. 7 to 10. Here, the optical-signal transmission form will be described with the optical division multiplexing transceiver described with reference to FIG. 5 serving as a model. FIGS. 7 to 10 illustrate the time waveforms of four channels' worth of optical pulse signals of the WDM channel and two channels' worth of optical pulse signals of the OCDM channel and the horizontal axis represents the time axis. The first to fourth channels of the WDM channel (first WDM channel to the fourth WDM channel) are shown as channel W1 to channel W4 respectively and the first and second channels of the OCDM channel (first OCDM channel and second OCDM channel) are shown as channel C1 and channel C2 respectively.

Figure 8:
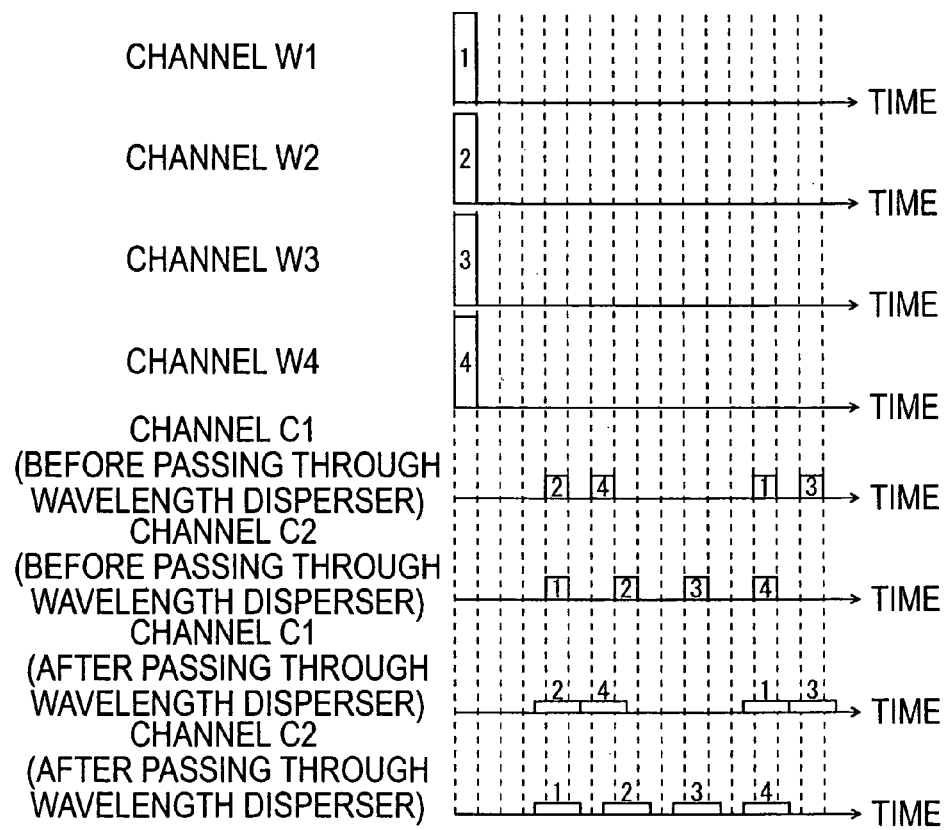
FIG. 8 shows a time waveform of an encoded optical pulse signal and a WDM-channel optical pulse signal.
Figure 9:
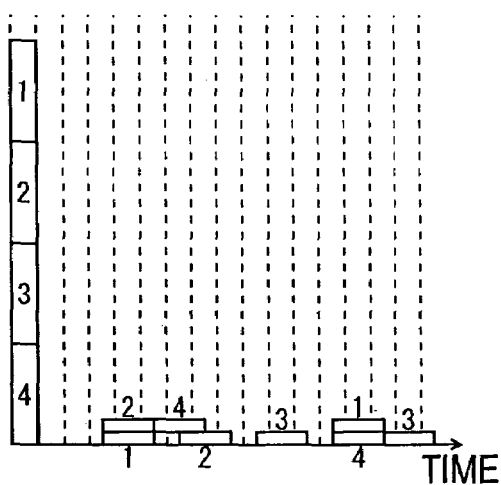
FIG. 9 shows a time waveform of an optical division multiplexing signal.
Figure 10:
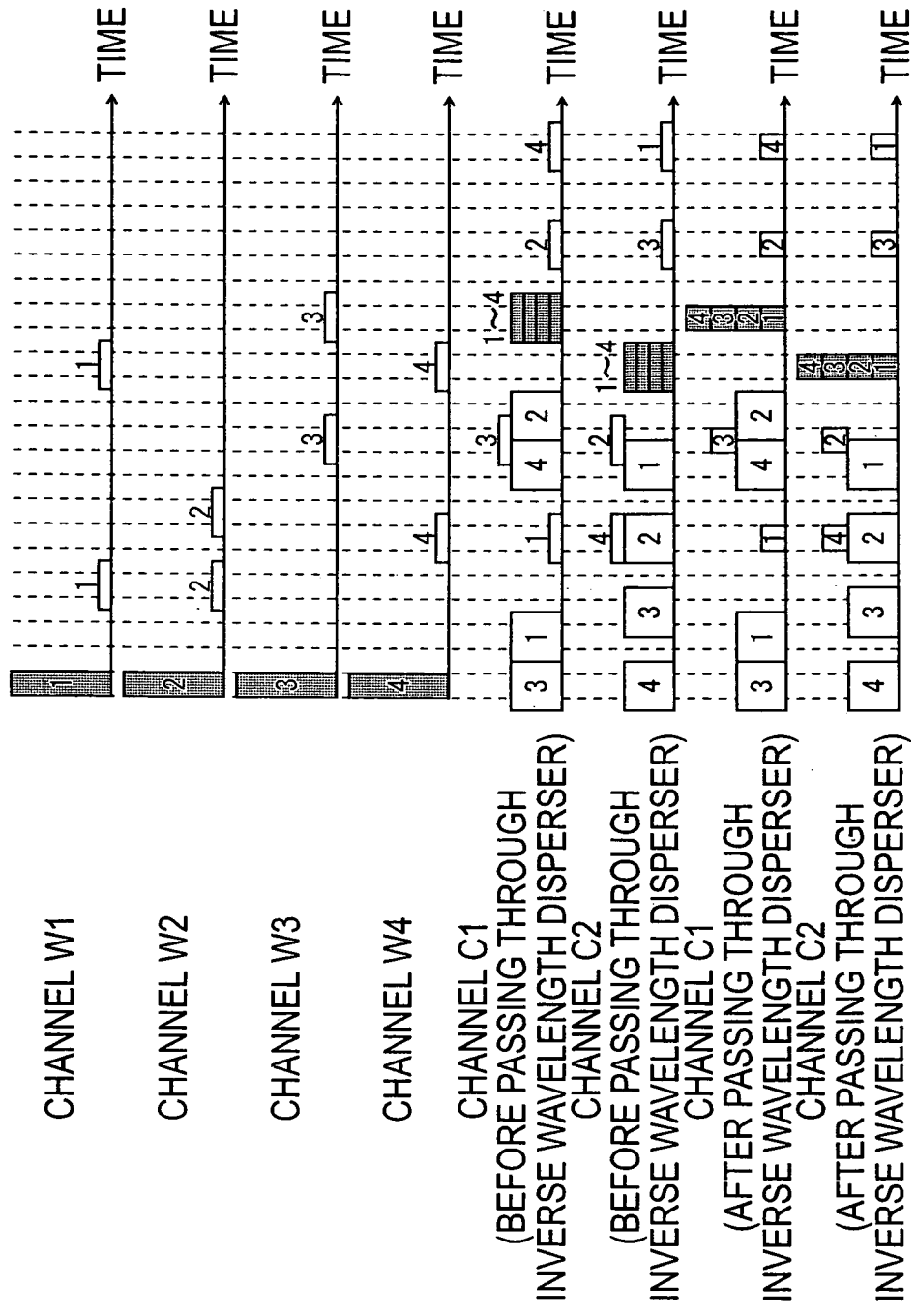
FIG. 10 shows a time waveform of an optical wavelength division signal and a decoded OCDM reception signal.

Furthermore, the gaps between the parallel broken lines in the vertical direction in FIGS. 8 to 10 illustrate the time slots. That is, one optical pulse or chip pulse is allocated to the gaps between the broken lines. Here, four WDM channels are described and two OCDM channels are described but the number of channels is not restricted to these quantities and the following description is similarly valid even with a few channels.

In FIGS. 7 to 10, as per FIGS. 3B to 3E, the optical pulses constituting the OCDM-channel optical pulse signals are constituted containing the wavelengths $\lambda_1$, $\lambda_2$, $\lambda_3$, and $\lambda_4$ and the respective channels of the WDM-channel optical pulse signals are constituted by means of single wavelengths of the wavelengths $\lambda_1$, $\lambda_2$, $\lambda_3$, and $\lambda_4$. In order to illustrate this, rectangles that surround the numbers 1, 2, 3, and 4 identifying the wavelengths $\lambda_1$, $\lambda_2$, $\lambda_3$, and $\lambda_4$ are expediently shown stacked on the same time. Here, the optical pulse signals constituted from optical pulses containing wavelengths of four different types are assumed and described. However, generally, the types of wavelengths contained in the optical pulses are not restricted to four types and the following description is similarly valid even when there are a few types.

Furthermore, as per FIGS. 3B to 3E, optical pulses containing different wavelength components are shown by stacking rectangles that surround identification numbers representing the wavelengths of the wavelength components of the optical pulses on the same time. Further, in FIGS. 7 to 10, one optical pulse is drawn occupying the same time slot, for the optical pulses of the WDM channel and the optical pulse signals of each channel of the OCDM channel.

In reality, an array of optical pulses that reflect a binary digital electrical signal obtained as a result of an optical pulse array undergoing optical modulation and an electrical pulse signal being converted to an optical pulse signal is an optical pulse signal. However, if the transmission form of a single optical pulse is judged, the same transmission form is adopted for all the optical pulses constituting the optical pulse signal and, therefore, in order to describe the transmission form of the optical pulse signal, it is sufficient to describe a case where one optical pulse occupies the same time slot. In the subsequent description with reference to FIGS. 7 to 10, this one optical pulse will also be called an optical pulse signal.

FIG. 7 shows an optical pulse signal that is outputted from an OCDM-channel intensity modulator (intensity modulator 512 for channel C1) and a WDM-channel intensity modulator (intensity modulator 534 for channel W1) of the transmission section 500 shown in FIG. 5. For example, the optical pulse signal of channel C1 is optical pulse signal 513 and the optical pulse signal of channel W1 is optical pulse signal 535.

FIG. 8 shows the positional relationship on the time axis between the optical pulse signals of channels W1 to W4 and the optical pulse signals of channels C1 and C2 after the optical pulse signals of channels C1 and C2 have been encoded. The shape of the optical pulse signals before and after passing through the wavelength disperser, that is, an encoded optical pulse signal and shaped and encoded optical pulse signal are shown for the optical pulse signals of channels C1 and C2. The figure text '(before passing through a wavelength disperser)' for channels C1 and C2 represents an encoded optical pulse signal and the figure text '(after passing through a wavelength disperser)' for channels C1 and C2 represents a shaped and encoded optical pulse signal. For example, the encoded optical pulse signal and shaped and encoded optical pulse signal of channel C1 are the encoded optical pulse signal 515 and shaped and encoded optical pulse signal 517 shown in FIG. 5 respectively.

As shown in FIG. 8, the encoded optical pulse signal is divided into chip pulses by the encoder. The dispositional relationship of the chip pulses of channels C1 and C2 is different because the dispositional relationship on the time axis of the chip pulses is decided by codes established for the encoders of the respective channels. That is, the difference in the dispositional relationship of the chip pulses is the identifier for distinguishing the channels C1 and C2.

Further, the width on the time axis of the chip pulses constituting the shaped and encoded optical pulse signals grows wider and exceeds the width of the time slots. This is the result of shaping the time waveforms of the chip pulses using a wavelength disperser. That is, this is the result of executing a time waveform shaping step.

Although the intensity of the optical pulse signals of channels W1 to W4 is shown as equal in FIG. 8, the intensities are actually a little different on account of the difference in characteristics of the intensity modulators of the respective channels, and so forth. Further, the intensity of the chip pulses constituting the shaped and encoded optical pulse signals of channels C1 and C2 is also somewhat different due to the difference in the characteristics of the encoder and wavelength disperser, and so forth, of each channel.

FIG. 9 shows the time waveform of the optical division multiplexing signal 541 generated by multiplexing the optical wavelength division multiplexing signal and the shaped and encoded optical pulse signal by means of the multiplexer 540 as shown in FIG. 5. The optical wavelength division multiplexing signal is regulated by equalizing the intensity of the optical pulses constituting the optical pulse signals of channels W1 to W4 by means of the power regulator. Further, the intensity of the chip pulses constituting the shaped and encoded optical pulse signals of channels C1 and C2 is also regulated equal by means of the power regulator.

The optical division multiplexing signal 541 is a signal that is generated by mixing the optical wavelength division multiplexing signal and the shaped and encoded optical pulse signal and, therefore, the respective time waveforms of the optical pulse signals of channels W1 to W4 and the chip pulses constituting the shaped and encoded optical pulse signals of channels C1 and C2 shown in FIG. 8 are exactly overlapped.

FIG. 10 shows a time waveform of an optical wavelength division signal that is outputted from the wavelength de-multiplexer 632 shown in FIG. 5 and a time waveform of the decoded OCDM reception signal and reproduced optical pulse signal of channels C1 and C2. The time waveforms of the optical pulse signals before and after passing through the inverse wavelength disperser 614, that is, the time waveforms of the decoded OCDM reception signal and reproduced optical pulse signal are shown for channels C1 and C2. The reproduced optical pulse signal has noise removed therefrom as a result of being supplied to the first threshold value judgment section 618 of each channel of the OCDM channel.

The figure text '(before passing through an inverse wavelength disperser)' for channels C1 and C2 represents a decoded OCDM reception signal and the figure text '(after passing through an inverse wavelength disperser)' for channels C1 and C2 represents a reproduced optical pulse signal. For example, the decoded OCDM reception signal and reproduced optical pulse signal of channel C1 are the decoded OCDM reception signal 613 and reproduced optical pulse signal 615 respectively shown in FIG. 5.

In FIG. 10, the optical pulse signal played back in each channel is shown shaded. That is, the optical pulses shown shaded are the reception signals of each channel. The other optical pulse components (unshaded components) are removed as noise in the first threshold value judgment section in the OCDM channel and the second threshold value judgment section in the WDM channel.

As mentioned earlier, the optical division multiplexing signal 541 is a signal generated by multiplexing the shaped and encoded optical pulse signals of the respective OCDM channels and the optical wavelength division multiplexing signals of the respective WDM channels by means of a multiplexer 540. Therefore, both the OCDM reception signal and WDM reception signal that are obtained by intensity-dividing the optical division multiplexing signal 541 by means of the de-multiplexer 605 equally contain the shaped and encoded optical pulse signals of the respective OCDM channels and the optical pulse signals of the respective WDM channels. This fact is described with reference to FIG. 10.

FIG. 10 shows the time waveforms of the optical signals supplied to the second threshold value judgment section for channels W1 and W4. That is, when the description is provided with channel W1 removed, the time waveform of the optical wavelength division signal 633. As mentioned earlier, the abovementioned optical signals originating in the OCDM channels invaded the optical wavelength division signal 633 via the multiplexer 540, the transmission path 550, the de-multiplexer 605, and the wavelength de-multiplexer 632.

The optical signals originating in the OCDM channels that invade channel W1 are subjected to wavelength dispersion by a wavelength disperser and, therefore, the time width of the optical signals increases. That is, the optical signals originating in the OCDM channel that invade channel W1 are shown in FIG. 10 with identification numbers such as '1' appended thereto as optical pulses that are equal to or wider than the width of the time slots.

Thus, because the time width of the optical signals originating in the OCDM channel increases, the peak value decreases and the optical wavelength division signal 633 of channel W1 that contains the optical signal component originating in the OCDM channel is removed as noise by the second threshold value judgment section 634. The WDM signal 635 of channel W1 is then extracted by the second threshold value judgment section 634. The same is true of channels W2 to W4.

FIG. 10 shows the time waveforms of the decoded OCDM reception signal before same is inputted to the inverse wavelength disperser and the reproduced optical pulse signal after passing through the inverse wavelength disperser, that is, which is outputted from the inverse wavelength disperser, for channels C1 and C2.

First, channel C1 will be described by way of example. The OCDM reception signal of channel C1 is inputted to the decoder 612 and outputted after being decoded as the decoded OCDM reception signal 613. The decoded OCDM reception signal 613 is inputted to the inverse wavelength disperser 614 and outputted as the reproduced optical pulse signal 615 after the shaped optical pulse signal component contained in the decoded OCDM reception signal 613 has been restored. That is, the inverse wavelength disperser 614 executes the time waveform restoration step. This fact is described with reference to FIG. 10.

In FIG. 10, the figure text 'channel C1 (before passing through the inverse wavelength disperser)' represents the time waveform of the decoded OCDM reception signal 613 outputted from the decoder 612.

As mentioned earlier, the optical signals originating in the WDM channel invade the OCDM reception signal 606 allocated to channel C1 via the multiplexer 540, transmission line 550, and de-multiplexer 605. Further, the optical signal component that originates in the WDM channel contained in the OCDM reception signal 606 does not pass through the wavelength disperser in the transmission section 500. However, the OCDM reception signal 606 is inputted to the decoder 612 and decoded and then outputted as the decoded OCDM reception signal 613.

In other words, the OCDM reception signal 606 is an optical signal that is generated by combining the optical pulse components originating in the WDM channel and the optical pulse components originating in the OCDM channel and, therefore, the optical pulse components originating in the WDM channel and the optical pulse components originating in the OCDM channel are both similarly decoded by the decoder 612. That is, although the optical pulse components originating in the OCDM channel are decoded, the optical pulse components originating in the WDM channel are actually encoded by the decoder 612.

As a result, as shown in the drawings in which 'channel C1 (before passing through the inverse wavelength disperser)' appears in FIG. 10, the optical pulse components originating in the WDM channel widen as chip pulses in the direction of the time axis. More specifically, where the chip pulses are concerned, the squares shown to surround numerical values indicated by 1 to 4 are optical pulse components that originate in the WDM channel. Further, the rectangles outside which numerical values denoted by 1 to 4 that are drawn as similarly increasing in the horizontal direction are appended denote optical pulse components that originate in channel C2.

The chip pulses of the optical pulse components originating in channel C2 exist spread out on the time axis. However, the optical pulse components originating in channel C1 exist overlapping on the time axis as shown with shading. This is because the optical pulse components originating in channel C1 are decoded so as to exist overlapping on the time axis as a result of being decoded by the decoder 612 for which the same codes as the encoder of channel C1 have been set. On the other hand, because the optical pulse components originating in channel C2 are encoded by the encoder of channel C2, the optical pulse components are not decoded by the decoder 612 for which codes that are different from the codes set for the encoder of channel C2 have been set. Hence, the chip pulses exist dispersed on the time axis.

Meanwhile, FIG. 10, in which 'channel C2 (before passing through the inverse wavelength disperser)' appears, shows the time waveform of a decoded OCDM reception signal that is outputted from the decoder of channel C2. In FIG. 10, contrary to what was stated earlier, the optical pulse components that originate in channel C2 are decoded. This is because this case is the same as the earlier case of channel C1.

However, the time width of the decoded optical pulse signals remains increased in the cases of channel C1 and also channel C2. That is, this is a state where the time waveform of the encoded optical pulse signal remains shaped by the wavelength disperser in the transmission section 500. Therefore, the decoded OCDM reception signal is inputted to the inverse wavelength disperser and the time width of the decoded optical pulse signal, which is in a state where the time waveform remains shaped, must be narrowed to a state prior to the shaping of the time waveform.

Therefore, for the time waveform of the reproduced optical pulse signal that is outputted from the inverse wavelength disperser, FIG. 10 shows 'channel C1 (after passing through an inverse wavelength disperser)' and 'channel C2 (after passing through an inverse wavelength disperser)' for channel C1 and channel C2 respectively.

As shown in FIG. 10 in which 'channel C1 (after passing through an inverse wavelength disperser)' appears, the time width of the optical pulse components originating in the channel C1 shown shaded narrows to the state prior to shaping of the time waveform. Likewise, as shown in FIG. 10 in which 'channel C2 (after passing through an inverse wavelength disperser)' appears, the time width of the optical pulse components originating in channel C2 that are shown shaded narrows to the state prior to shaping of the time waveform. That is, the respective autocorrelation waveforms (shaded in FIG. 10) of the optical pulse signals of the transmitted channels C1 and C2 are generated.

Thus, in channel C1, the optical signals originating in the WDM channel have a small peak value as a result of the time width thereof increasing. Further, the time width of the optical signals originating in channel C2 is also extended. Therefore, among the optical signals 615 of channel C1, the optical signal components originating in the WDM channel and the optical signal components originating in channel 2 are removed as noise by the first threshold value judgment section 618. Further, the OCDM signal 619 of channel C1 is extracted by the first threshold value judgment section 618.

As in channel C2, the peak value of optical signals originating in the WDM channel is small as a result of an increase in the time width of the optical signals. Further, the time width of the optical signals originating in channel C1 is also extended. Therefore, among the optical signals of channel C1, the optical signal components originating in the WDM channel and the optical signal components originating in channel C1 are removed as noise by the first threshold value judgment section of channel C2. The OCDM signal of channel C2 is then extracted by the first threshold value judgment section of channel C2.

Here, the constitutional examples of the first and second threshold value judgment sections will be described. The first and second threshold value judgment sections with the constitution described here can also be used in the second embodiment that will be described subsequently.

The first and second threshold value judgment sections can be constituted by using a nonlinear optical fiber loop. This example will be described as a first example.

The constitution of the nonlinear optical fiber loop and the operating principles thereof are described in the document (Govind P. Agrawal et al: "Nonlinear Fiber Optics", Second Edition, Academic Press, published in 1989). An example of threshold value processing by using a nonlinear optical fiber loop is disclosed in the document (Ju Han Lee et al., "Reduction of Interchannel Interference Noise in a Two-Channel Grating-Based OCDMA System Using a Nonlinear Optical Loop Mirror", IEEE, Photonics Technology Letters, Vol. 13, No. 5, May 2001, pp. 529-531). In both documents, the dependence of the phase difference between light that is propagated clockwise by a nonlinear optical fiber loop and light that is propagated counterclockwise on the intensity of the signal that is inputted to the nonlinear optical fiber loop as a result of the nonlinear optical effect that is produced in the optical fiber constituting the nonlinear optical fiber loop is used.

The light that is inputted to the nonlinear optical fiber loop is divided into light that is propagated clockwise by the nonlinear optical fiber loop and light that is propagated counterclockwise by a directional optical coupler. By establishing the branching ratio by delaying same from 1:1, the phase difference between the light propagated clockwise by the nonlinear optical fiber loop and the light propagated counterclockwise can be made nonlinearly dependent on the intensity of the input light. As a result, when the light inputted to the nonlinear optical fiber loop is strong, the light can be outputted as transmitted light from the nonlinear optical fiber loop and, conversely, when the light is weak, the light can be outputted as reflected light.

Because the intensity of the light component that is removed as noise is weak, this light component is outputted as reflected light from the nonlinear optical fiber loop. Further, because the intensity of the optical signal component is strong, the optical signal component is outputted as transmitted light from the nonlinear optical fiber loop. This fact is used to make it possible to remove only the optical signal component obtained as transmitted light from the transmitted light output port of the nonlinear optical fiber loop. That is, threshold value processing of the light inputted to the nonlinear optical fiber loop can be executed.

Furthermore, the first and second threshold value judgment sections can be constituted by using a light saturable absorber. This example will be described as a second example.

The constitution and operating principles of the threshold value judgment element constituted by using the light saturable absorber are described in detail in Document (Japanese Patent Application Laid Open No. 2003-248251). According to this document, a carbon nanotube is used as the light saturable absorber. It is known that a carbon nanotube has a nonlinear optical characteristic that the rate of absorption decreases in proportion to the $2^{nd}$ power of the light intensity. If this quality is utilized, an operation similar to that of the threshold value judgment element that uses the abovementioned nonlinear optical fiber loop can be implemented.

That is, when the light intensity inputted to the light saturable absorber is strong, the light saturable absorber is a transparent body and outputs transmitted light. On the other hand, when the light intensity inputted to the light saturable absorber is weak, the light saturable absorber is nontransparent and the input light is blocked.

The intensity of the light component removed as noise is weak and therefore reflected by the light saturable absorber. Further, because the intensity of the optical signal component is strong, the optical signal component is transmitted by the light saturable absorber and outputted as transmitted light. This fact is used to make it possible to remove only the optical signal component obtained as transmitted light from the transmitted light output port of the threshold value judgment element formed by using a light saturable absorber. That is, threshold value processing of the light inputted to the nonlinear light saturable absorber can be executed.

Second Embodiment

An optical division multiplexing transmission and reception method and a device for implementing this method of the second embodiment will be described with reference to FIG. 11. The optical division multiplexing transmission and reception device comprises a transmission section 700 that comprises in parallel an optical code division multiplexing signal generation section 710 and an optical time division multiplexing signal generation section 730, and a reception section 800 that comprises in parallel an optical code division multiplexing signal extraction section 810 and an optical time division multiplexing signal extraction section 830.

In the subsequent description, the optical time division multiplexing signal generation section is also abbreviated as OTDM signal generation section and the optical time division multiplexing signal extraction section is also abbreviated as the OTDM signal extraction section.

The constitution of an OCDM signal generation section 710 is the same as that of the OCDM signal generation section 510 shown in FIG. 5. That is, an intensity modulator 712 corresponds to the intensity modulator 512, an encoder 714 corresponds to the encoder 514, a wavelength disperser 716 corresponds to the wavelength disperser 516, and a power regulator 720 corresponds to the power regulator 520. Therefore, in the OCDM signal generation section 710, the description of the steps up to the point where the time waveform shaped step is executed and the shaped and encoded optical pulse signal is generated is omitted here.

The optical time division multiplexing signal generation step is implemented by the OTDM signal generation section 730. The OTDM signal generation section 730 generates an optical time division multiplexing signal by allocating different time slots to each channel.

Figure 11:
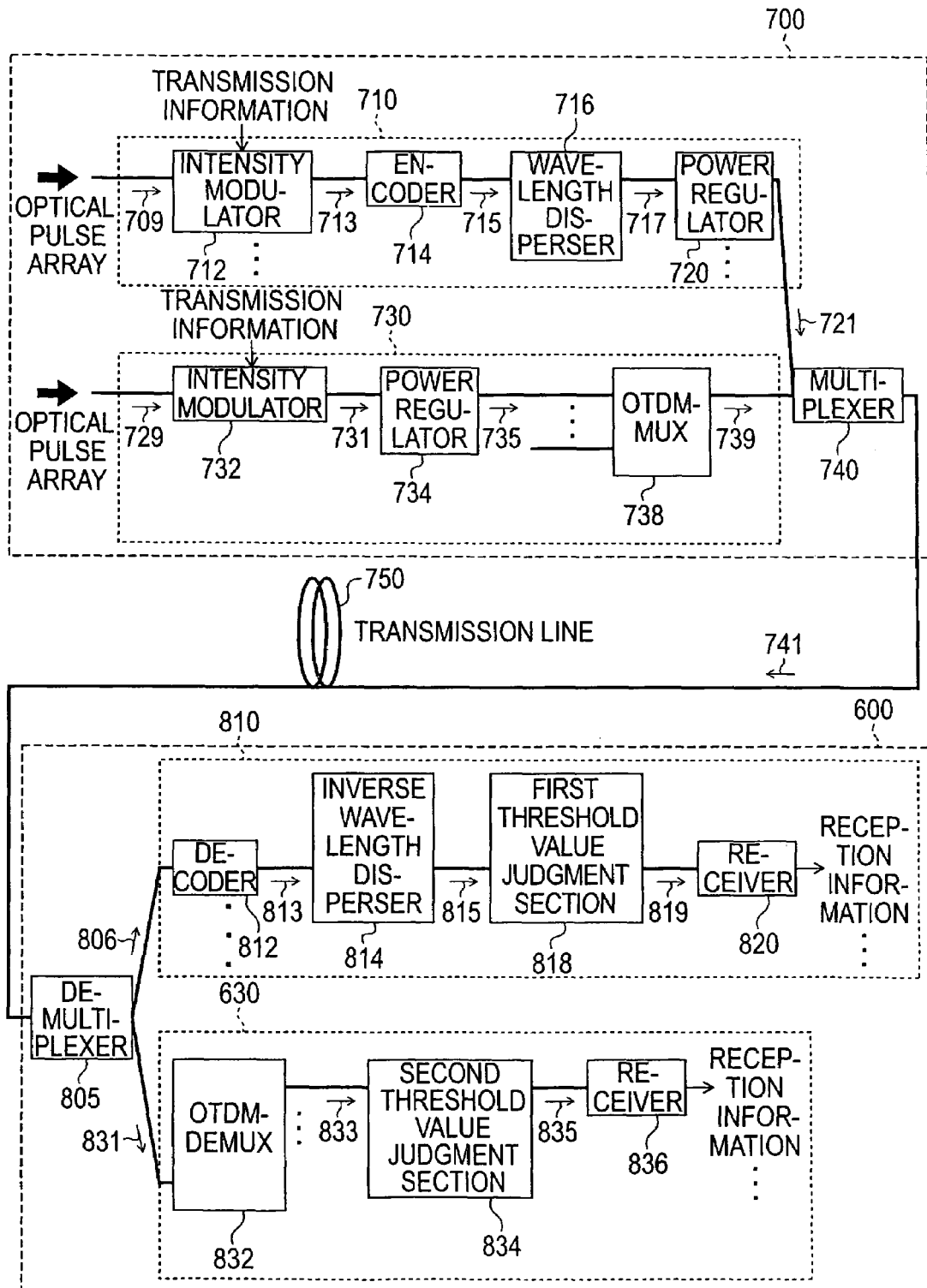
FIG. 11 is a schematic block constitutional view of the optical division multiplexing transmission and reception device of the second embodiment.

The OCDM signal generation section 710 that executes the optical code division multiplexing signal generation step and the OTDM signal generation section 730 that executes the optical time division multiplexing signal generation step are provided in parallel as shown in FIG. 11.

So too in FIG. 11, only one channel's worth of each of the OCDM signal generation section 710 and the OTDM signal generation section 730 is shown as per FIG. 5 and the other channels are omitted. Except for the fact that the codes set for the encoders of the OCDM signal generation sections 710 that are arranged in parallel in a quantity equal to the number of OCDM channels are different, the other constituent elements are the same. However, the wavelength dispersion characteristics of the wavelength disperser 716 may be the same for each channel or different for each channel. Further, the OTDM signal generation sections 730 that are arranged in parallel in a quantity corresponding to the number of OTDM channels have the same constitution for each channel up to the point where the signals of the respective OTDM channels are inputted to an optical time division multiplexing signal mixing section 738.

In the following description, two of each of the OCDM channels and OTDM channels are sometimes described for the sake of expediency. However, it is obvious that the following description is valid irrespective of the number of channels.

The transmission section 700 further comprises a multiplexer 740 that generates an optical division multiplexing signal by multiplexing a shaped and encoded optical pulse signal and an optical time division multiplexing signal. On the other hand, the reception section 800 comprises a de-multiplexer 805 that divides the received optical division multiplexing signal into an optical code division multiplexing reception signal and an optical time division multiplexing reception signal.

The optical code division multiplexing signal extraction step is the same as the step that is executed by the OCDM signal extraction section 610 of the optical division transmission and reception device of the first embodiment that was described with reference to FIG. 5. Therefore, a detailed description is omitted.

The decoder 812 of the optical code division multiplexing signal extraction section 810 generates a decoded optical code division multiplexing reception signal from the optical code division multiplexing reception signal. A reproduced optical pulse signal is generated by an inverse wavelength disperser 814 from the shaped optical pulse signal component contained in the decoded optical code division multiplexing reception signal. Only the autocorrelation waveform component of the optical pulse signal constituting the transmission signal is extracted from the reproduced optical pulse signal by a first threshold value judgment section 818. Further, the time waveform shaping step is performed by the wavelength disperser 716 and the time waveform restoration step is performed by the inverse wavelength disperser 814.

The optical time division multiplexing signal extraction step is executed by the OTDM signal extraction section 830. In the OTDM signal extraction section 830, an optical time division multiplexing signal of each channel is extracted from the optical wavelength division multiplexing reception signal by the second threshold value judgment section 834 that the OTDM signal extraction section comprises.

The constitution of the OCDM signal generation sections 710 of the OCDM channels of the transmission section 700 is the same as the constitution of the OCDM signal generation sections 510 of the optical division multiplexing transmission and reception device of the first invention and, therefore, a description of the constitution and operation of the constitution of the OCDM signal generation sections 710 is omitted.

Furthermore, because the constitution and function of the wavelength disperser 716 and inverse wavelength disperser 814, which are features of the optical division multiplexing transmission and reception method and the device that that implements this method of this embodiment, are the same as those of the wavelength disperser 516 and inverse wavelength disperser 614, a description thereof is omitted here. The characteristic of the optical division multiplexing transmission and reception method and the device that implements this method of the second embodiment is that the transmission step comprises an encoding step that is executed by the encoder 714 and a time waveform shaping step that is executed by the wavelength disperser 716.

The constitution of the OTDM signal generation sections 730 of the OTDM channels of the transmission section 700 will be described next with reference to FIG. 11. The OTDM signal generation section 730 has a plurality of OTDM channels installed in parallel. Here, the first OTDM channel will be described by way of representative example. Because the other OTDM channels also have the same structure, a description thereof will be omitted here.

The OTDM signal generation section 730 is constituted comprising an intensity modulator 732, a power regulator 734, and an optical time division multiplexing signal mixing section 738. First, an optical pulse array 729 is inputted to the intensity modulator 732, which is a constituent element of the OTDM signal generation section 730. Here also, the optical pulse array 729 contains light of the wavelengths $\lambda_1, \lambda_2, \lambda_3,$ and $\lambda_4$ as per the OCDM-channel case.

The intensity modulator 732 has a function for converting a binary digital electrical signal, which is transmission information on the first OTDM channel, into an RZ-formatted optical pulse signal. The optical pulse array 729 that is inputted to the intensity modulator 732 is outputted as an optical pulse signal 731 that reflects the transmission information of the first OTDM channel. The optical pulse signal 731 contains light of the wavelengths $\lambda_1, \lambda_2, \lambda_3,$ and $\lambda_4$. That is, when the optical pulses that constitute the optical pulse signal 731 are divided, the optical pulses are divided into optical pulses the center wavelengths of which are the wavelengths $\lambda_1, \lambda_2,$ and $\lambda_3$, and so forth respectively.

The optical pulse signal 731 is inputted to the power regulator 734 such that the power is regulated and the optical pulse signal is outputted as the optical pulse signal 735, which is inputted to the optical time division multiplexing signal mixing section 738. The power regulator 734 is also installed with the same objective as that for the power regulator 720 that is provided in the OCDM signal generation section 710.

The power regulator 734 is installed in order to render the intensity of the optical pulse signals of the respective OTDM channels uniform. When the intensities of the optical pulse signals differ greatly between the respective OTDM channels, there is the possibility that the second threshold value judgment section of the reception section 800 will no longer be able to extract only the optical time division multiplexing signals of the respective OTDM channels.

In the case of the optical time division multiplexing signal mixing section 738, the optical pulse signals of the respective OTDM channels are mixed by adding a time lag so that the optical pulse signals lie within the time slots allocated to each channel. The optical time division multiplexing signal thus mixed is generated and outputted by the optical time division multiplexing signal mixing section 738.

As described hereinabove, the shaped and encoded optical pulse signals of the respective OCDM channels and the optical time division multiplexing signal 739 that is generated by multiplexing the optical pulse signals of the respective OTDM channels are mixed by the multiplexer 740 to produce an optical division multiplexing signal 741 that is sent to the reception section 800 as a result of propagation by the transmission line 750 that is constituted by optical fiber. Here, the shaped and encoded optical pulse signals of the respective OCDM channels signify two channels' worth including the shaped and encoded optical pulse signal 721 of the first OCDM channel and are shaped and encoded optical pulse signals that are generated by multiplexing the shaped and encoded optical pulse signals of the first and second OCDM channels.

The constitution and function of the reception section 800 will be described next. The reception section 800 comprises the de-multiplexer 805, the OCDM signal extraction section 810, and the OTDM signal extraction section 830 and the OCDM signal extraction section 810 and OTDM signal extraction section 830 are constituted in parallel.

The constitution of the OCDM signal extraction section 810 is the same as that of the OCDM signal extraction section 610 shown in FIG. 5. That is, the decoder 812 corresponds to the decoder 612, the inverse wavelength disperser 814 corresponds to the inverse wavelength disperser 614, the first threshold value judgment section 818 corresponds to the first threshold value judgment section 618, and the receiver 820 corresponds to the receiver 620. Therefore, the OCDM signal extraction section 810 executes an optical code division multiplexing signal extraction step and a description of the steps up to the point where the optical pulse signals of the respective OCDM channels are played back will be omitted.

The optical division multiplexing signal 741 is inputted to the de-multiplexer 805 and divided into an OCDM reception signal 806 and an OTDM reception signal 831. The optical division multiplexing signal 741 is a signal that is generated by multiplexing, by means of the multiplexer 740, the shaped and encoded optical pulse signals of the respective OCDM channels and the time division multiplexing signal generated by multiplexing the optical pulse signals of the respective OTDM channels. Therefore, both the OCDM reception signal and the OTDM reception signal, which are obtained by subjecting the optical division multiplexing signal 741 to intensity division by means of the de-multiplexer 805, are signals that equally contain the shaped and encoded optical pulse signals of the respective OCDM channels and the optical time division multiplexing signal of the respective OTDM channels.

Among the OCDM reception signals that are supplied to the OCDM signal extraction section 810, the OCDM reception signal 806 that is allocated to the first OCDM channel is inputted to the decoder 812 and outputted decoded as a decoded OCDM reception signal 813. The decoded OCDM reception signal 813 is inputted to the inverse wavelength disperser 814 and the shaped and encoded optical pulse signal component contained in the decoded OCDM reception signal 813 is restored and outputted as a reproduced optical pulse signal 815. That is, the inverse wavelength disperser 814 executes a time waveform restoration step.

Here, although components other than the shaped and encoded optical pulse signal component are also contained in the decoded OCDM reception signal 813, the components other than the shaped and encoded optical pulse signal component are processed as noise in the subsequent steps of the first OCDM channel. Therefore, the effective signal outputted from the inverse wavelength disperser 814 is the reproduced optical pulse signal 815. A detailed description of the decoded OCDM reception signal 813 and the shaped and encoded optical pulse signal component and so forth will be provided subsequently.

The reproduced optical pulse signal 815 is inputted to the first threshold value judgment section 818 and, as a result of the first threshold value judgment step being executed, only an autocorrelation waveform component 819 of an optical pulse signal 713 that reflects transmission information on the first OCDM channel is outputted. The autocorrelation waveform component 819 is inputted to the receiver 820, the autocorrelation waveform component 819 constituting an optical pulse signal is converted (O/E converted) into an electrical pulse signal and acquired by the reception section 800 as reception information on the first OCDM channel.

That is, the transmission information on the first OCDM channel transmitted from the transmission section 700 is received by the reception section 800 as reception information on the first OCDM channel.

Meanwhile, the OTDM reception signal 831 supplied to the OTDM signal extraction section 830 will be described. Here also, the first OTDM channel will be described representatively as per the description of the OTDM signal generation section 730 above. The OTDM reception signal 831 that is supplied to the OTDM signal extraction section 830 is inputted to an optical time division multiplexing signal division section 832 and separated into optical time division signals that correspond with each of the OTDM channels that are supplied to the second threshold value judgment sections of the respective channels. Of these, an optical time division signal 833 that is supplied to the second threshold value judgment section 834 of the first OTDM channel is inputted to a receiver 836 as a result of a second threshold value judgment step being executed and an OTDM signal 835 of the first OTDM channel being extracted. That is, transmission information on the first OTDM channel that is transmitted from the transmission section 700 is received by the reception section 800 as reception information on the first OTDM channel.

Here also, as per the OCDM-channel case, the optical time division signal 833 that is supplied to the second threshold value judgment section 834 also contains a shaped and encoded optical pulse signal component of the OCDM channel. However, the shaped and encoded optical pulse signal component of the OCDM channel is processed as noise in the subsequent steps of the first OTDM channel. A detailed description of the shaped and encoded optical pulse signal component of the OCDM channel and so forth will also be provided subsequently.

The optical-signal transmission form of the optical division multiplexing transmission and reception device of the second embodiment will now be described with reference to FIGS. 12 to 18. Here, the optical-signal transmission form will be described by taking the optical division multiplexing transmission and reception device described with reference to FIG. 11 as a model. FIGS. 12 to 18 show the time waveforms of two channels' worth of optical pulse signals of the OTDM channels and two channels' worth of optical pulse signals of the OCDM channels, where the horizontal axis represents the time axis. The first and second channels of the OTDM channels (first OTDM channel and second OTDM channel) are shown as channel T1 and channel T2 respectively, and the first and second channels of the OCDM channels (the first OCDM channel and second OCDM channel) are shown as channel C1 and channel C2 respectively.

Furthermore, the gaps between the parallel broken lines in the vertical direction in FIGS. 13 to 18 illustrate the time slots. That is, one optical pulse or chip pulse is allocated to the time zones interposed between the broken lines. Here, two OTDM channels are described and two OCDM channels are described but the number of channels is not restricted to these quantities and the following description is similarly valid even with a few channels.

In FIGS. 12 to 18, the optical pulse signals of the OCDM channels and the optical pulses constituting the optical pulse signals of the OTDM channels are constituted containing the wavelengths $\lambda_1$, $\lambda_2$, $\lambda_3$, and $\lambda_4$. In order to illustrate this, rectangles that surround the numbers 1, 2, 3, and 4 identifying the wavelengths $\lambda_1$, $\lambda_2$, $\lambda_3$, and $\lambda_4$ are expediently shown stacked on the same time. Here, the description is provided by assuming optical pulse signals constituted from optical pulses containing wavelengths of four different types. However, generally, the types of wavelengths contained in the optical pulses are not restricted to four types and the following description is similarly valid even when there are a few types. The types of wavelengths contained in the optical pulses are selected in a suitable number depending on the code length set for the encoder. Generally, when an encoder and a decoder for which codes of code length n (n is a natural number) have been set are used, it is convenient to establish n types of wavelengths contained in the optical pulses.

Further, suppose that optical pulses containing the different wavelength components are shown by stacking rectangles that surround identification numbers representing the wavelength components of the optical pulses on the same time. Further, in FIGS. 12 to 18, as per FIGS. 7 to 10, one optical pulse is drawn occupying the same time slot, for the optical pulse signals of each of the channels of the OTDM channel and the OCDM channel. In the subsequent description with reference to FIGS. 12 to 18, this one optical pulse will also be called an optical pulse signal as per the description of the optical division multiplexing transmission and reception device of the first embodiment.

Figure 12:
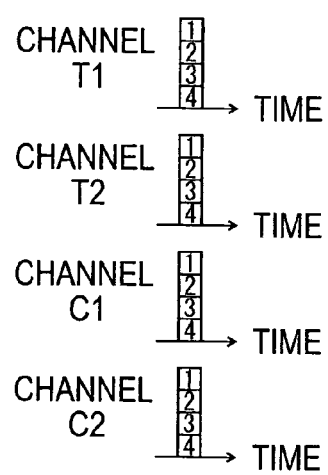
FIG. 12 shows a time waveform of an optical pulse signal that is outputted by an intensity modulator.

FIG. 12 shows an optical pulse signal that is outputted from an OCDM-channel intensity modulator (intensity modulator 712 for channel C1) and an OTDM-channel intensity modulator (intensity modulator 732 for channel T1) of the transmission section 700 shown in FIG. 11. For example, the optical pulse signal of channel C1 is optical pulse signal 713 and the optical pulse signal of channel T1 is optical pulse signal 731.

Figure 13:
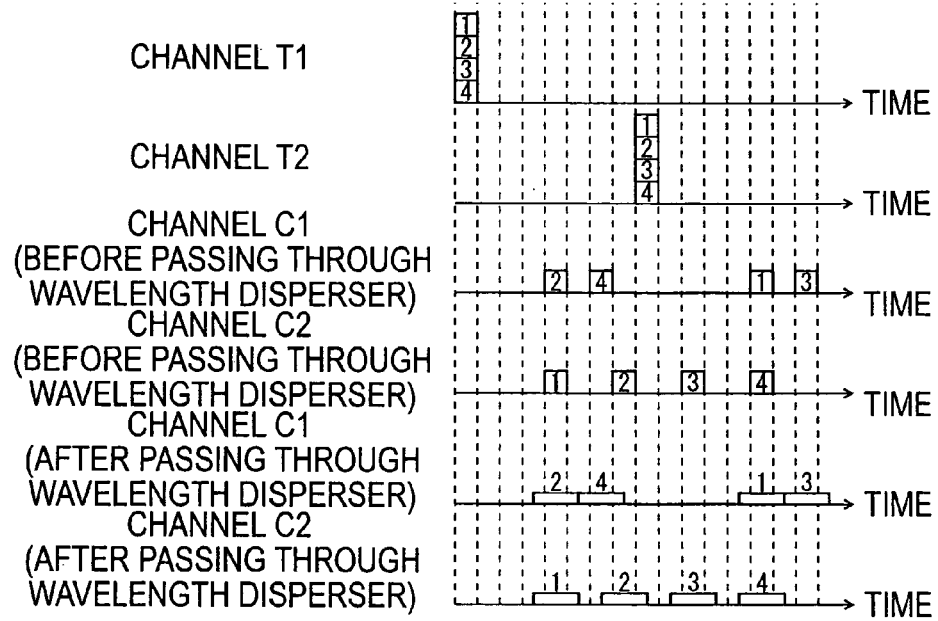
FIG. 13 shows a time waveform of an encoded optical pulse signal and an OTDM-channel optical pulse signal.

FIG. 13 shows the dispositional relationship on the time axis between the optical pulse signals of channels T1 and T2 and optical pulse signals of channels C1 and C2. For the optical pulse signals of channels C1 and C2, the shape of the optical pulse signals before and after passing through the wavelength disperser, that is, the encoded optical pulse signal and the shaped and encoded optical pulse signal, are shown. The figure text '(before passing through a wavelength disperser)' for channels C1 and C2 represents an encoded optical pulse signal and the figure text '(after passing through a wavelength disperser)' for channels C1 and C2 represents a shaped and encoded optical pulse signal. For example, the encoded optical pulse signal and shaped and encoded optical pulse signal of channel C1 are the encoded optical pulse signal 715 and shaped and encoded optical pulse signal 717 shown in FIG. 11 respectively.

As shown in FIG. 13, the encoded optical pulse signal is divided into chip pulses by the encoder. The dispositional relationship of the chip pulses of channels C1 and C2 is different because the dispositional relationship on the time axis of the chip pulses is decided by codes established for the encoders of the respective channels. That is, the difference in the dispositional relationship of the chip pulses is the identifier for distinguishing the channels C1 and C2.

Further, the width on the time axis of the chip pulses constituting the shaped and encoded optical pulse signals increases and exceeds the width of the time slots. This is the effect of shaping the time waveform of the chip pulses by means of the wavelength disperser, that is, the effect of executing the time waveform shaping step.

In FIG. 13, although the intensities of the optical pulse signals of channels T1 and T2 have been drawn equal, the intensities are actually a little different on account of the difference in the characteristics of the intensity modulators of the respective channels. Further, the intensities of the chip pulses that constitute the shaped and encoded optical pulse signals of channels C1 and C2 are a little different due to the difference in the characteristics of the encoders and wavelength dispersers and so forth of the respective channels.

Figure 14:
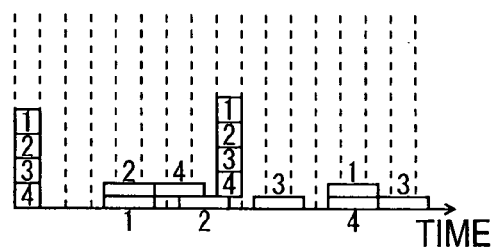
FIG. 14 shows a time waveform of an optical division multiplexing signal.

FIG. 14 shows the time waveform of the optical division multiplexing signal 741 that is generated by multiplexing the optical time division multiplexing signal and the shaped and encoded optical pulse signal by means of the multiplexer 740 as shown in FIG. 11. The optical division multiplexing signals are mixed after adjusting the intensities of the optical pulses constituting the optical pulse signals of channels T1 and T2 by means of a power regulator so that the intensities are equal. Further, the intensities of the chip pulses constituting the shaped and encoded optical pulse signals of channels C1 and C2 are also mixed after being regulated so that the intensities are equal by the power regulator.

The optical division multiplexing signal 741 is a signal that is generated by multiplexing the optical time division multiplexing signal and the shaped and encoded optical pulse signal and, therefore, the respective time waveforms of the optical pulse signals of the channels T1 and T2 shown in FIG. 13 and the chip pulses constituting the shaped and encoded optical pulse signals of channels C1 and C2 are exactly stacked.

Figure 15:
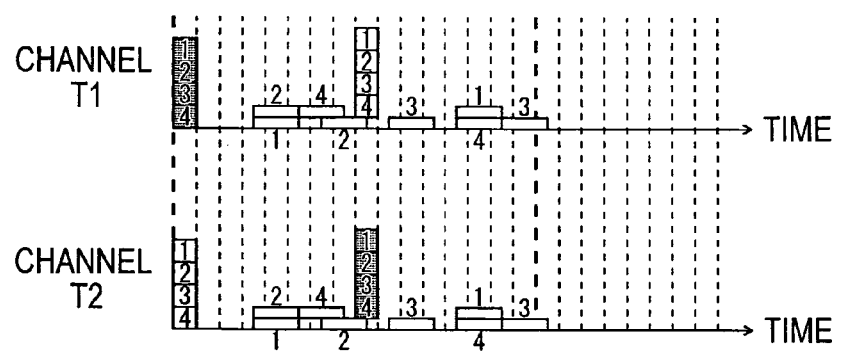
FIG. 15 shows a time waveform (one) of an optical time division multiplexing reception signal.

FIG. 15 shows a time waveform of the optical pulse signals obtained as a result of the OCDM reception signal 806, which is generated by dividing the optical division multiplexing signal 741 by means of the de-multiplexer 805 shown in FIG. 11, being inputted to the optical time division multiplexing signal division section 832 and intensity-divided for each OTDM channel. In FIG. 15, time slots that are allocated to one bit's worth of the OTDM channel are shown by means of thick upright broken lines. That is, the time interval that is sandwiched by the thick upright broken lines denotes a time slot that is allocated to one bit's worth of the OTDM channel. Further, the thin upright broken lines indicate time slots to which one chip pulse's worth is allocated. That is, the time intervals sandwiched by the thin upright broken lines indicate time slots to which one chip pulse's worth is allocated.

Hereinafter, the time slots are sometimes represented by distinguishing the time slots to which one bit's worth is allocated as bit slots and the time slots to which one chip pulse's worth is allocated as chip slots.

Figure 16:
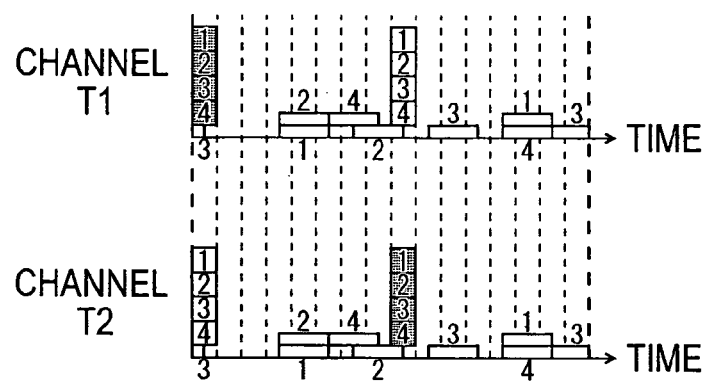
FIG. 16 shows a time waveform (two) of an optical time division multiplexing reception signal.

Furthermore, here, first, in order to avoid confusion, the presence of optical pulses or chip pulses is represented by limiting same only to the one bit-slot range. In reality, because optical pulses or chip pulses also exist in adjacent bit slots, the time waveforms should be drawn with that taken into consideration. As described subsequently, time waveforms for a case where optical pulses or chip pulses that exist in adjacent bit slots are considered are shown in FIG. 16. Therefore, FIG. 15 is (1) and FIG. 16 is (2).

In (the upper diagram) of FIG. 15, which illustrates a time waveform that is allocated to channel T1, the OTDM signal of channel T1 is shown with the optical pulses shaded. Further, in (the lower diagram) of FIG. 15, which illustrates a time waveform that is allocated to channel T2, the OTDM signal of channel T2 is shown with the optical pulses shaded.

Further, chip pulses other than the optical pulses representing the OTDM signals of channels T1 and T2, the half-value width of which increases on the time axis, are chip pulse components that originate in the OCDM channel. As shown in FIG. 15, the reason why the time widths of chip pulse components that originate in the OCDM channel increase is because the chip pulse components are wavelength-dispersed by the wavelength disperser set for the OCDM signal generation section 710.

As mentioned earlier, FIG. 16 shows time waveforms for optical pulse signals, which are obtained through intensity division for each OTDM channel, by considering optical pulses or chip pulses that exist in adjacent bit slots. The diagram at the top shows a time waveform allocated to channel T1 and the diagram at the bottom shows a time waveform allocated to channel T2.

The difference from FIG. 15 is that the components of adjacent bit slots penetrate the borders of the time axis demarcating the bit slot, for example. For example, the chip pulse component of wavelength $\lambda_3$ penetrates the lowest part of the optical pulse representing the OTDM signal of channel T1 shown with shading of channel T1. This corresponds, in FIG. 15, to the chip pulse component of wavelength $\lambda_3$ in which a portion of the chip pulse of wavelength $\lambda_3$ that exists extending over the thick broken lines on the right side that occupies the border of the time axis that demarcates the bit slot penetrates the lowest part of the optical pulse representing the OTDM signal of the channel T1 shown in FIG. 16. The time waveform shown in FIG. 16 is actually an eye pattern that is observed by means of a light-sampling oscilloscope and so forth.

As shown in FIG. 16, the optical pulses of channel T1 and channel T2 coexist in one bit slot. Therefore, the optical pulses of channel T2 must be cut in channel T1 and the optical pulses of channel T1 must be cut in channel T2. This is the time gate step. The time gate step is performed, as is conventionally known, by using a clock signal that is extracted from the OTDM reception signal 831 or the like. Because the time gate step can be executed as long as a conventionally known procedure is used, a description of the time gate step is omitted here.

The abovementioned time gate step is executed. Shaded optical pulses in the upper diagram are selected for channel T1 and shaded optical pulses in the lower diagram are selected for channel T2.

However, the chip pulse components that exist spread out with respect to the time axis cannot be removed from both channels. Therefore, in channel T1, for example, the second threshold value judgment step is executed by the second threshold value judgment section 834. Thus, the chip pulse components with an increased time width have a smaller intensity than the shaded optical pulse signals and are therefore removed by the second threshold value judgment section 834 to extract the OTDM signal 835 of channel T1. That is, transmission information on channel T1 that is transmitted from the transmission section 700 is received by the reception section 800 as reception information on channel T1. That is, the shaped and encoded optical pulse signal components of the OCDM channels, which are chip pulse components of an increased time width, are processed as noise in channel T1.

The OTDM signal 835 of channel T1 is inputted to the receiver 836, converted (O/E converted) into an electrical pulse signal, and acquired by the reception section 800 as reception information on channel T1. That is, transmission information on channel T1 that is transmitted from the transmission section 700 is received by the reception section 800 as reception information on channel T1.

By executing the second threshold value judgment step similarly in channel T2, the OTDM signal of channel T2 that is removed by the second threshold value judgment section is extracted and received by the reception section 800 as reception information on channel T2. The OTDM signal on channel T2 is also similarly O/E converted and the transmission information on channel T2 that is transmitted from the transmission section 700 is received by the reception section 800 as reception information on channel T2.

Figure 17:
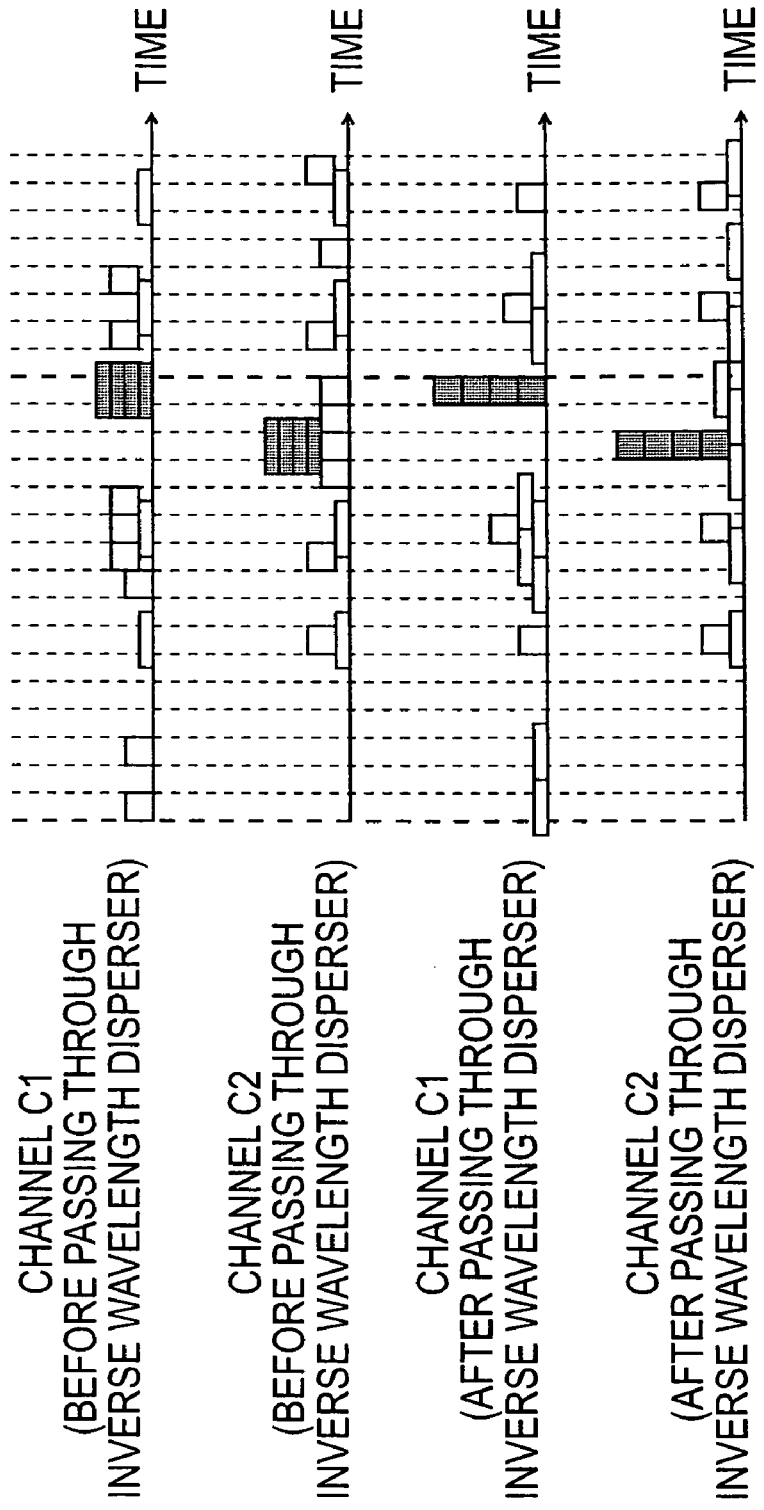
FIG. 17 shows a time waveform (one) of a decoded optical code division multiplexing reception signal.

FIG. 17 shows time waveforms of decoded optical code division multiplexing signals that are outputted by the decoder of the optical code division multiplexing signal extraction section 810. FIG. 17 shows the time waveform of the decoded OCDM reception signal 813 that is inputted to the inverse wavelength disperser 814 of channel C1 at the highest level and the time waveform of the decoded OCDM reception signal that is inputted to the inverse wavelength disperser of channel C2 similarly to channel C1 on the second level. Further, FIG. 17 shows, starting at the top, the time waveform of the reproduced optical pulse signal 815 that is outputted from the inverse wavelength disperser 814 of channel C1 on the third level, and the time waveform of the reproduced optical pulse signal that is outputted from the inverse wavelength disperser of channel C2 similarly to channel C1 on the fourth level. The reproduced optical pulse signal is supplied to the first threshold value judgment sections of the respective channels of the OCDM channel and noise is removed.

In FIG. 17, optical pulse signals that are played back on each channel are shown shaded. The optical pulses that are shown shaded in the third and fourth levels of FIG. 17 are self- and mutual-correlation waveform components that are contained in the reproduced optical pulse signals of the respective channels. The other optical pulse components (unshaded components) are removed by the first threshold value judgment section as noise.

FIG. 17 also shows time slots that are allocated to one bit's worth of the OCDM channel by means of thick upright broken lines as per FIG. 15. Narrow upright broken lines also indicate time slots to which one chip pulse's worth is allocated.

As mentioned earlier, the optical division multiplexing signal 741 is a signal that is generated by multiplexing shaped and encoded optical pulse signals of the respective OCDM channels and the optical pulse signals of the respective OTDM channels by means of the multiplexer 740. Therefore, both the OCDM reception signal and the OTDM reception signal obtained by intensity-dividing the optical division multiplexing signal 741 by means of the de-multiplexer 805 equally contain the shaped and encoded optical pulse signals of the respective OCDM channels and the optical pulse signals of the respective OTDM channels. This fact is described with reference to FIGS. 15 and 17.

FIG. 15 shows time waveforms for optical signals that are supplied to the second threshold value judgment section for channels T1 and T2. That is, when the description is provided with channel T1 removed, the time waveform of the optical time division signal 833 is shown. As mentioned earlier, optical signals originating in an OCDM channel invade the optical time division signal 833 via the multiplexer 740, transmission line 750, de-multiplexer 805, and optical time division multiplexing signal division section 832.

Optical signals that originate in the OCDM channel that have invaded channel T1 undergo wavelength dispersion by means of the wavelength disperser and therefore the time widths increase. That is, optical signals that originate in the OCDM channel that have invaded channel T1 are shown in FIG. 15 as optical pulses that have widened at or above the width of the time slots.

Thus, because the time widths of the optical signals originating in the OCDM channel increase, the peak values of the optical signals decrease and the optical time division signal 833 of channel T1 containing the optical signal components that originate in the OCDM channel is removed as noise by means of the second threshold value judgment section 834. Further, the OTDM signal 835 of channel T1 is extracted from the second threshold value judgment section 834. The above is also true for channel T2.

FIG. 17 shows, for channels C1 and C2, time waveforms of decoded OCDM reception signal before same is inputted to the inverse wavelength disperser and of a reproduced optical pulse signal that is an optical pulse signal after passing through the inverse wavelength disperser outputted from the inverse wavelength disperser.

First, channel C1 will be described by way of example. The OCDM reception signal of channel C1 is inputted to the decoder 812 and decoded and outputted as the decoded OCDM reception signal 813. The decoded OCDM reception signal 813 is inputted to the inverse wavelength disperser 814 and the shaped and encoded optical pulse signal component contained in the decoded OCDM reception signal 813 is restored and outputted as the reproduced optical pulse signal 815. That is, the inverse wavelength disperser 814 executes a time waveform restoration step. This is illustrated with reference to FIG. 17.

FIG. 17, which is shown with 'channel C1 (before passing through the inverse wavelength disperser)', shows the time waveform of the decoded OCDM reception signal 813 that is outputted from the decoder 812.

As mentioned earlier, the optical signal originating in the OTDM channel invades the OCDM reception signal 806 allocated to channel C1 via the multiplexer 740, the transmission line 750, and the de-multiplexer 805. The optical signal component that originates in the OTDM channel contained in the OCDM reception signal 806 does not pass through the wavelength disperser in the transmission section 700. However, the OCDM reception signal 806 is inputted to the decoder 812 and decoded thereby and then outputted as the decoded OCDM reception signal 813.

In other words, the OCDM reception signal 806 is an optical signal that is generated by combining the optical pulse components originating in the OTDM channel and the optical pulse components that originate in the OCDM channel and, therefore, both the optical pulse components that originate in the OTDM channel and the optical pulse components that originate in the OCDM channel are both similarly decoded by the decoder 812. That is, although the optical pulse components that originate in the OCDM channel are decoded, the optical pulse components originating in the OTDM channel are actually encoded by means of the decoder 812.

Hence, as illustrated by 'channel C1 (before passing through the inverse wavelength disperser)' in FIG. 17, the optical pulse components originating in the OTDM channel exist dispersed as chip pulses on the time axis. More specifically, where the chip pulses are concerned, the squares shown to surround numerical values indicated by 1 to 4 are optical pulse components that originate in the OTDM channel. Further, the rectangles outside which numerical values denoted by 1 to 4 that are drawn as similarly increasing in the horizontal direction are appended denote optical pulse components that originate in channel C2.

The chip pulses of the optical pulse components originating in channel C2 exist spread out on the time axis. However, the optical pulse components originating in channel C1 exist overlapping on the time axis as shown with shading. This is because the optical pulse components originating in channel C1 are decoded so as to exist overlapping on the time axis as a result of being decoded by the decoder 812 for which the same codes as the encoder of channel C1 have been set. On the other hand, because the optical pulse components originating in channel C2 are encoded by the encoder of channel C2, the optical pulse components are not decoded by the decoder 812 for which codes that are different from the codes set for the encoder of channel C2 have been set. Hence, the chip pulses exist dispersed on the time axis.

Meanwhile, FIG. 17, in which 'channel C2 (before passing through the inverse wavelength disperser)' appears, shows the time waveform of a decoded OCDM reception signal that is outputted from the decoder of channel C2. In FIG. 17, contrary to what was stated earlier, the optical pulse components that originate in channel C2 are decoded. This is because this case is the same as the earlier case of channel C1.

However, the time width of the decoded optical pulse signals remains increased in the cases of channel C1 and also channel C2. That is, this is a state where the time waveform of the encoded optical pulse signal remains shaped by the wavelength disperser in the transmission section 700. Therefore, the decoded OCDM reception signal is inputted to the inverse wavelength disperser and the time width of the decoded optical pulse signal, which is in a state where the time waveform remains shaped, must be narrowed to a state prior to the shaping of the time waveform.

Therefore, the time waveform of the reproduced optical pulse signal that is outputted from the inverse wavelength disperser will be considered next. For the time waveform of the reproduced optical pulse signal, FIG. 17 shows 'channel C1 (after passing through an inverse wavelength disperser)' and 'channel C2 (after passing through an inverse wavelength disperser)' for channel C1 and channel C2 respectively.

As shown in FIG. 17 in which 'channel C1 (after passing through an inverse wavelength disperser)' appears, the time width of the optical pulse components originating in the channel C1 shown shaded narrows to the state prior to shaping of the time waveform. Likewise, as shown in FIG. 17 in which 'channel C2 (after passing through an inverse wavelength disperser)' appears, the time width of the optical pulse components originating in channel C2 that are shown shaded narrows to the state prior to shaping of the time waveform. That is, the respective autocorrelation waveforms (shaded in FIG. 10) of the optical pulse signals of the transmitted channels C1 and C2 are generated.

Thus, in channel C1, the optical signals originating in the OTDM channel have a small peak value as a result of the time width thereof increasing. Further, the time width of the optical signals originating in channel C2 is also extended. Therefore, among the optical signals 815 of channel C1, the optical signal components relating to the OTDM channel and the optical signal components relating to channel 2 are removed as noise by the first threshold value judgment section 818. Further, the OCDM signal 819 of channel C1 is extracted by the first threshold value judgment section 818.

As in channel C2, the peak value of optical signals originating in the OTDM channel is small as a result of an increase in the time width of the optical signals. Further, the time width of the optical signals originating in channel C1 is also extended. Therefore, among the optical signals of channel C2, the optical signal components relating to the OTDM channel and the optical signal components relating to channel C1 are removed as noise by the first threshold value judgment section of channel C2. The OCDM signal of channel C2 is then extracted by the first threshold value judgment section of channel C2.

Figure 18:
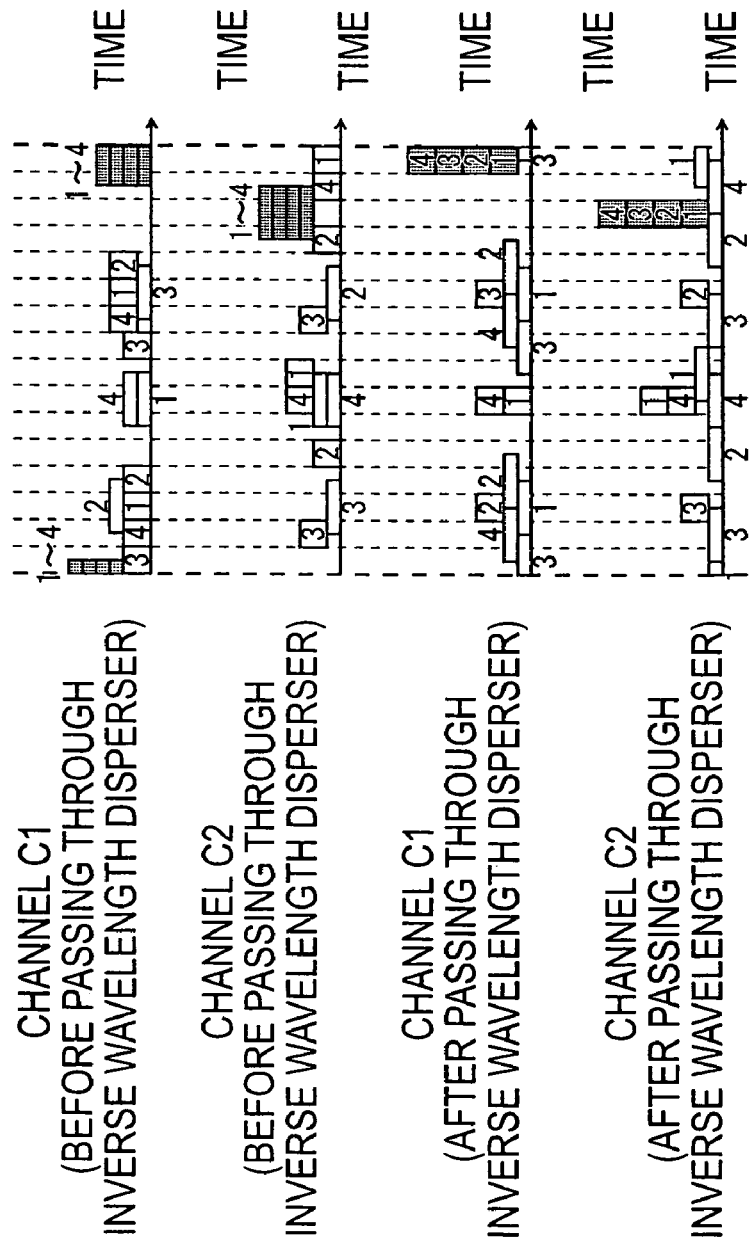
FIG. 18 shows a time waveform (two) of a decoded optical code division multiplexing reception signal.

So too in FIG. 17, time slots that are allocated to one bit's worth of the OTDM channel are shown by means of thick upright broken lines as per FIG. 15. That is, the time interval that is sandwiched by the thick upright broken lines denotes a time slot that is allocated to one bit's worth of the OTDM channel. Further, the thin upright broken lines indicate time slots to which one chip pulse's worth is allocated. That is, the time intervals sandwiched by the thin upright broken lines indicate time slots to which one chip pulse's worth is allocated. Furthermore, here also, the presence of optical pulses or chip pulses is represented by limiting same only to the one bit-slot range. A time waveform for a case where optical pulses or chip pulses that exist in adjacent bit slots are considered is shown in FIG. 18. Therefore, FIG. 17 is (1) and FIG. 18 is (2).

In FIG. 17, in the diagrams (the diagrams of the uppermost and third levels of FIG. 17) that show the time waveforms allocated to channel C1, the optical pulses representing the OCDM signal of channel C1 are shown shaded and, in the diagrams (the diagrams of the second and fourth levels of FIG. 17) that show the time waveforms allocated to channel C2, the optical pulses representing the OCDM signal of channel C2 are shown shaded.

As mentioned earlier, FIG. 18 shows time waveforms for optical pulse signals, which are obtained through intensity division for each OCDM channel, by considering optical pulses or chip pulses that exist in adjacent bit slots. The difference from FIG. 17 is that the components of adjacent bit slots penetrate the borders of the time axis demarcating the bit slot, for example.

For example, in FIG. 17, a portion of the optical pulse representing the OCDM signal (time width is extended) of channel C1 that is shown with shading of channel C1 is drawn extending over the border of the time axis that demarcates the bit slot. In FIG. 18, the part that is drawn jutting into the next time slot is drawn stacked on the chip pulse of wavelength $\lambda_3$. That is, in FIG. 17, a portion of the OCDM signal of channel C1 that exists extending over the thick broken lines on the right that indicate the border of the time axis demarcating the bit slot is drawn stacked on the chip pulse component of wavelength $\lambda_3$ that is shown in FIG. 18. A portion of the optical pulses representing the OCDM signal of channel C1 is a component penetrated by the adjacent bit slot.

The time waveform shown in FIG. 18 is actually an eye pattern that is observed by means of a light-sampling oscilloscope and so forth.

The OCDM signal 819 of channel C1 is inputted to the receiver 820, O/E converted, and acquired by the reception section 800 as reception information on channel C1. That is, transmission information on channel C1 that is transmitted from the transmission section 700 is received by the reception section 800 as reception information on channel C1.

The OCDM signal of channel C2 is extracted and received by the reception section 800 as reception information on channel C2. The OCDM signal of channel C2 is also similarly O/E converted and transmission information on channel C2 that is transmitted from the transmission section 700 is received by the reception section 800 as reception information on channel C2.

What is claimed is:

1. An optical division multiplexing transmission and reception method, comprising:
    a transmission step and a reception step, wherein
    said transmission step comprises, in parallel,
    an optical code division multiplexing signal generation step that comprises an encoding step that generates an encoded optical pulse signal by encoding an optical pulse signal of each channel by allocating a different time-spreading/wavelength-hopping code to each channel and a time waveform shaping step that generates a shaped and encoded optical pulse signal by shaping the time waveform of said encoded optical pulse signal; and
    an optical time division multiplexing signal generation step that generates an optical time division multiplexing signal by allocating a different time slot to each channel, and said transmission step further comprises:
    a multiplexing step that generates an optical division multiplexing signal by multiplexing said shaped and encoded optical pulse signal and said optical time division multiplexing signal, and wherein
    said reception step comprises, in parallel,
    a de-multiplexing step that divides said optical division multiplexing signal into an optical code division multiplexing reception signal and an optical time division multiplexing reception signal;
    an optical code division multiplexing signal extraction step that comprises a decoding step that generates a decoded optical code division multiplexing reception signal by decoding said optical code division multiplexing reception signal by using the same code as said time-spreading/wavelength-hopping code for each of said channels, a time waveform restoration step that generates a reproduced optical pulse signal by restoring the shaped optical pulse signal component contained in said decoded optical code division multiplexing reception signal, and a first threshold value judging step for extracting only said autocorrelation waveform component from said reproduced optical pulse signal; and
    an optical time division multiplexing signal extraction step that comprises a time gate step that separates an optical time division signal for each channel through optical time division of said optical time division multiplexing reception signal and a second threshold value judging step that extracts an optical time division multiplexing signal by performing a threshold value judgment on said optical time division signal.

2. An optical division multiplexing transmission and reception device, comprising:
    a transmission section and a reception section, wherein
    said transmission section comprises, in parallel,
    an optical code division multiplexing signal generation section that comprises an encoder that generates an encoded optical pulse signal by encoding an optical pulse signal of each channel by allocating a different time-spreading/wavelength-hopping code to each channel and a wavelength disperser that generates a shaped and encoded optical pulse signal by shaping the time waveform of said encoded optical pulse signal; and
    an optical time division multiplexing signal generation section that generates an optical time division multiplexing signal by allocating a different time slot to each channel, and said transmission section further comprises:
    a multiplexer that generates an optical division multiplexing signal by multiplexing said shaped and encoded optical pulse signal and said optical time division multiplexing signal, and wherein
    said reception section comprises, in parallel,
    a de-multiplexer that divides said optical division multiplexing signal into an optical code division multiplexing reception signal and an optical time division multiplexing reception signal;
    an optical code division multiplexing signal extraction section that comprises a decoder that generates a decoded optical code division multiplexing reception signal by decoding said optical code division multiplexing reception signal by using the same code as said time-spreading/wavelength-hopping code for each of said channels, an inverse wavelength disperser that performs wavelength dispersion, in which absolute values are equal and codes are reversed with respect to the dispersion values of said wavelength disperser, and that generates a reproduced optical pulse signal by restoring said shaped optical pulse signal component contained in said decoded optical code division multiplexing reception signal, and a first threshold value judgment section for extracting only the autocorrelation waveform component of said optical pulse signal from said reproduced optical pulse signal; and an optical time division multiplexing signal extraction section that comprises an optical time division multiplexing signal division section that separates an optical time division signal for each channel by subjecting said optical time division multiplexing reception signal to optical time division and a second threshold value judgment section that extracts an optical time division multiplexing signal by performing a threshold value judgment on said optical time division signal.

3. The optical division multiplexing transmission and reception device according to claim 2, wherein said encoder is constituted comprising a Fiber Bragg grating.

4. The optical division multiplexing transmission and reception device according to claim 2, wherein said decoder is constituted comprising a Fiber Bragg grating.

5. The optical division multiplexing transmission and reception device according to claim 2, wherein said first threshold value judgment section is constituted comprising a nonlinear fiber loop.

6. The optical division multiplexing transmission and reception device according to claim 2, wherein said second threshold value judgment section is constituted comprising a nonlinear fiber loop.

7. The optical division multiplexing transmission and reception device according to claim 2, wherein said first threshold value judgment section is constituted comprising a light saturable absorber.

8. The optical division multiplexing transmission and reception device according to claim 2, wherein said second threshold value judgment section is constituted comprising a light saturable absorber.

* * * * *

UNITED STATES PATENT AND TRADEMARK OFFICE
CERTIFICATE OF CORRECTION

PATENT NO. : 7,620,324 B2  Page 1 of 1
APPLICATION NO. : 11/361357
DATED : November 17, 2009
INVENTOR(S) : Minato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this

Twenty-sixth Day of October, 2010

David J. Kappos
*Director of the United States Patent and Trademark Office*